US012775265B2

(12) United States Patent
Bitan et al.

(10) Patent No.: US 12,775,265 B2
(45) Date of Patent: Oct. 27, 2026

(54) METHOD AND SYSTEM FOR ENCODING DATA FOR ADDITIVE MANUFACTURING

(71) Applicant: Stratasys Ltd., Rehovot (IL)

(72) Inventors: Ido Bitan, Yehud-Monosson (IL); Ben Klein, Tel-Aviv (IL); Nathan Yehuda Klein, Jerusalem (IL); Shaul Cemel, Givatayim (IL); Eli Swissa, Ness-Ziona (IL); Yosef Meller, Even Yehuda (IL)

(73) Assignee: Stratasys Ltd., Rehovot (IL)

( * ) Notice: Subject to any disclaimer, the term of this patent is extended or adjusted under 35 U.S.C. 154(b) by 310 days.

(21) Appl. No.: 18/714,149

(22) PCT Filed: Nov. 29, 2022

(86) PCT No.: PCT/IL2022/051270
§ 371 (c)(1),
(2) Date: May 29, 2024

(87) PCT Pub. No.: WO2023/095148
PCT Pub. Date: Jun. 1, 2023

(65) Prior Publication Data

US 2025/0021075 A1 Jan. 16, 2025

Related U.S. Application Data

(60) Provisional application No. 63/283,636, filed on Nov. 29, 2021.

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
None
See application file for complete search history.

(56) References Cited

U.S. PATENT DOCUMENTS

| | | | |
|---|---|---|---|
| 6,259,962 | B1 | 7/2001 | Gothait |
| 6,569,373 | B2 | 5/2003 | Napadensky |

(Continued)

FOREIGN PATENT DOCUMENTS

| | | |
|---|---|---|
| CN | 305053721 | 3/2019 |
| CN | 306713322 | 7/2021 |

(Continued)

OTHER PUBLICATIONS

Ex Parte Quayle Official Action Dated Mar. 6, 2024 From the US Patent and Trademark Office Re. U.S. Appl. No. 29/817,057. (15 Pages).

(Continued)

*Primary Examiner* — David Earl Ogg

(57) ABSTRACT

A method of encoding data for additive manufacturing comprises: displaying a graphical user interface (GUI) having at least a planar segment selector control, a pattern shaping control, and a material selection control. The method also comprises displaying on the GUI a cross-section of a three-dimensional object at a position corresponding to a specific planar segment selected by the planar segment selector control. A planar pattern having nested contours is displayed over the cross-section, wherein each contour is shaped according to an input received by the pattern shaping control and is associated with at least one building material according to an input received by the material selection control. A data structure describing the planar pattern is stored in a computer storage.

20 Claims, 15 Drawing Sheets

(56) References Cited

U.S. PATENT DOCUMENTS

| | | | |
|---|---|---|---|
| 6,658,314 B1 | 12/2003 | Gothait | |
| 6,850,334 B1 | 2/2005 | Gothait | |
| 7,183,335 B2 | 2/2007 | Napadensky | |
| 7,209,797 B2 | 4/2007 | Kritchman et al. | |
| 7,225,045 B2 | 5/2007 | Gothait et al. | |
| 7,300,619 B2 | 11/2007 | Napadensky et al. | |
| 7,479,510 B2 | 1/2009 | Napadensky et al. | |
| 7,500,846 B2 | 3/2009 | Eshed et al. | |
| D608,787 S | 1/2010 | Power et al. | |
| 7,962,237 B2 | 6/2011 | Kritchman | |
| D682,857 S | 5/2013 | Friedlander et al. | |
| D692,454 S | 10/2013 | Pearcy et al. | |
| D692,916 S | 11/2013 | Granchi et al. | |
| D708,211 S | 7/2014 | Capua et al. | |
| D742,394 S | 11/2015 | Bouchard et al. | |
| D762,239 S | 7/2016 | Seo et al. | |
| D766,976 S | 9/2016 | McElreath | |
| D771,671 S | 11/2016 | Eder | |
| D782,529 S | 3/2017 | Dzjind et al. | |
| D800,148 S | 10/2017 | Conn | |
| D858,564 S | 9/2019 | Schlereth et al. | |
| D926,208 S | 7/2021 | Zheng et al. | |
| D963,665 S | 9/2022 | Wilson et al. | |
| D969,820 S | 11/2022 | Reinmann et al. | |
| D998,628 S | 9/2023 | Dinga et al. | |
| D1,013,702 S | 2/2024 | Rex | |
| D1,019,690 S | 3/2024 | Tran et al. | |
| 11,922,712 B2 | 3/2024 | Al. | |
| D1,023,026 S | 4/2024 | Hickernell et al. | |
| D1,025,087 S | 4/2024 | Thornberg | |
| D1,027,975 S | 5/2024 | Dcal | |
| D1,029,854 S | 6/2024 | Zhong et al. | |
| 2011/0071798 A1 | 3/2011 | Kraemer et al. | |
| 2012/0179281 A1 | 7/2012 | Steingart et al. | |
| 2012/0281013 A1 | 11/2012 | Mahdavi et al. | |
| 2016/0288439 A1 | 10/2016 | Louko | |
| 2017/0109915 A1 | 4/2017 | Kreeger et al. | |
| 2017/0278301 A1 | 9/2017 | Peterson et al. | |
| 2018/0285517 A1 | 10/2018 | Reichental et al. | |
| 2018/0314216 A1 | 11/2018 | Tuncer et al. | |
| 2019/0033832 A1 | 1/2019 | Clement et al. | |
| 2020/0138551 A1 | 5/2020 | Strong et al. | |
| 2020/0155321 A1* | 5/2020 | Dikovsky | A61F 2/3094 |
| 2020/0324482 A1* | 10/2020 | Taig | B29C 64/386 |
| 2020/0342152 A1 | 10/2020 | Van Der Velden et al. | |
| 2020/0346411 A1* | 11/2020 | Arad | B33Y 50/02 |
| 2020/0406553 A1* | 12/2020 | Lebron | B29C 64/386 |
| 2021/0307911 A1 | 10/2021 | Metcalfe et al. | |
| 2021/0362424 A1 | 11/2021 | Tastl et al. | |
| 2022/0075346 A1 | 3/2022 | Picper et al. | |
| 2023/0132201 A1 | 4/2023 | Chekh et al. | |
| 2023/0161927 A1 | 5/2023 | Stiles et al. | |

FOREIGN PATENT DOCUMENTS

| | | |
|---|---|---|
| CN | 308304170 | 11/2023 |
| IL | 68807 | 5/2022 |
| JP | D1762611 | 1/2024 |
| KR | 300886143.0000 | 12/2016 |
| KR | 300902848.0000 | 4/2017 |
| WO | WO 2019/021295 | 1/2019 |
| WO | WO D220802-001 | 5/2022 |
| WO | WO 2023/095148 | 6/2023 |

OTHER PUBLICATIONS

Formalities Notice—Requirements for Registration Not Met Dated Jun. 29, 2022 From the Australian Government, IP Australia Re. Application No. 202213080. (2 Pages).

International Preliminary Report on Patentability Dated Jun. 13, 2024 From the International Bureau of WIPO Re. Application No. PCT/IL2022/051270 (9 Pages).

International Search Report and the Written Opinion Dated Mar. 27, 2023 From the International Searching Authority Re. Application No. PCT/IL2022/051270. (18 Pages).

Notice of Allowance Dated Jun. 25, 2024 from the US Patent and Trademark Office Re. U.S. Appl. No. 29/817,057. (9 pages).

Notice of Amendment Dated Jan. 25, 2024 From the State Intellectual Property Office of the People's Republic of China Re. Application No. 202230282540.9 and Its Translation Into English. (3 Pages).

Notification of Amendment Dated Jul. 13, 2023 From The State Intellectual Property Office of the People's Republic of China Re. Application No. 202230282540.9 and Its Machine Translation Into English (2 Page).

Notification of Refusal—Rule 18 of the Common Regulations Under the hague Agreement, Subsection 22(3) and Section 43 of the Industrial Design Regulations of Canada Dated Apr. 10, 2024 From the Innovation, Science and Economic Development Canada, Canadian Intellectual Property Office Re. Application No. 213073. (3 Pages).

Notification of Refusal—Rule 18(2) of the Common Regulations Dated Jul. 7, 2023 From the Hague Agreement Concerning The International Registration of Industrial Designs Re. Application No. JPO 2022-500746 and Its Translation Into English. (18 Pages).

Altair "Altar Brings Powerful Design and Engineering Software to Broader Community with Release of Altar HyperWorks 2019", AddIT Europe, Retrieved Online Feb. 27, 2024, pp. 1, Jun. 14, 2019.

Bitan "How the Latest Innovations in 3D Printing Technology Are Changing the Healthcare Industry", Stratasys, Retrieved Online Feb. 27, 2024, pp. 2, Jul. 20, 2022.

Dobbie GX25 3D Printed Propane Carcurator, YouTube, Retrieved Online Feb. 27, 2024, pp. 1, Mar. 10, 2021.

Jumekubo4edu "TinkerCad-Shape Generators #1", YouTube, Retrieved Online Feb. 26, 2024, pp. 1, Feb. 12, 2015.

Leung et al. "Challenges and Status on Design and Computation for Emerging Additive Manufacturing Technologies", Journal of Computing and Information Science in Engineering, XP055658891, 19(2): 021013-1-021013-21, Published Online Mar. 18, 2019.

Maker's Muse "Reverse Engineering the 101Hero #D Printer in Onshape—WAS Live", YouTube, Retrieved Online Feb. 27, 2024, pp. 1, May 28, 2016.

Nahum "Pre-Printing Tips for PolyJet on GrabCAD Print: GrabCAD Tutorials", Stratasys, CRABCAD, XP093031310, 20 P., Jun. 24, 2019.

Print That Thing "Flatten Designs for 3D Printing with Blender 2.8—Design for 3D Print", YouTube, Retrieved Online Feb. 27, 2024, pp. 1, May 3, 2019.

PROLIM Global Corporation "Design for Additive Manufacturing in NX", YouTube, Retrieved Online Feb. 27, 2024, pp. 1, Jun. 21, 2018.

Takahashi et al. "Programmable Filament Printed Filaments for Multi-Material 3D Printing", Proceedings of the 33rd Annual ACM Symposium on User Interface Software and Technology, UIST'20, Virtual Event, USA, Oct. 20-23, 2020, XP058726789, p. 1209-1221, Oct. 20, 2020.

Notice of Amendment Dated Aug. 21, 2024 From the china National Intellectual Property Administration Re. Application No. 202230282540.9 and Its Explanation Into English. (3 Pages).

* cited by examiner

METHOD AND SYSTEM FOR ENCODING DATA FOR ADDITIVE MANUFACTURING

RELATED APPLICATIONS

This application is a National Phase of PCT Patent Application No. PCT/IL2022/051270 having International filing date of Nov. 29, 2022 which claims the benefit of priority under 35 USC § 119(e) of U.S. Provisional Patent Application No. 63/283,636 filed on Nov. 29, 2021. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to a method and a system for encoding data for additive manufacturing.

Additive manufacturing (AM) is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM). The basic operation of any AM system consists of slicing a three-dimensional computer model into thin cross sections, translating the result into two-dimensional position data and feeding the data to control equipment which manufacture a three-dimensional structure in a layerwise manner.

One type of AM is three-dimensional inkjet printing processes. In this process, a building material is dispensed from a dispensing head having a set of nozzles to deposit layers on a supporting structure. Depending on the building material, the layers may then be cured or solidified using a suitable device.

Various three-dimensional inkjet printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237, and International Publication No. WO2019/021295, the contents of which are hereby incorporated by reference. For example, International Publication No. WO2019/021295 discloses a technique for manufacturing an object featuring properties of a hard bodily tissue. Voxel elements containing different material formulations are dispensed at interlaced locations to form a textured region. Once the textured region is hardened, it exhibits specific mechanical properties.

SUMMARY OF THE INVENTION

According to an aspect of some embodiments of the present invention there is provided a method of encoding data for additive manufacturing. The method comprises: displaying a graphical user interface (GUI) having at least a planar segment selector control, a pattern shaping control, and a material selection control. The method also comprises displaying on the GUI a cross-section of a three-dimensional object at a position corresponding to a specific planar segment selected by the planar segment selector control. The method additionally comprises displaying over the displayed cross-section, a planar pattern having nested contours, wherein each contour is shaped according to an input received by the pattern shaping control and is associated with at least one building material according to an input received by the material selection control. The method further comprises storing in a computer storage a data structure describing the planar pattern.

According to some embodiments of the invention the method comprises loading an image of an additional three-dimensional object into the GUI, loading the data structure from the computer storage, and displaying the planar pattern over a cross-section of the additional three-dimensional object.

According to some embodiments of the invention the method comprises transmitting an interrogating signal to an additive manufacturing system, responsively receiving a signal pertaining to types of building materials loaded to the system, and configuring the material selection control to allow selection only among the types of building materials.

According to some embodiments of the invention the GUI comprises a background building material selection control, and the method comprises: receiving from the background building material selection control input pertaining to a selection of a background building material or a selection of a background combination of building materials; and associating all regions of the three-dimensional object for which no input is received by the material selection control with one or more building materials according to the input from the background building material selection control.

According to some embodiments of the invention the planar pattern comprises an outermost contour along a periphery of the cross-section, wherein the pattern shaping control is configured to disallow defining for the outermost contour a width less than a predefined threshold.

According to some embodiments of the invention the planar pattern comprises an outermost contour along a periphery of the cross-section, and the material selection control is configured to disallow selecting at least one building material for the outermost contour.

According to some embodiments of the invention the pattern shaping control is configured to receive, for each contour, contour parameters as the input, the parameters comprising a distance of the contour from a periphery of the cross-section and a width of the contour, or distances of an outer and an inner boundary of the contour from the periphery of the cross-section.

According to some embodiments of the invention at least one of the contour parameters is fixed along the contour.

According to some embodiments of the invention for at least one of the contour parameters, the pattern shaping control is configured to receive a contour variation rule for gradually varying the contour parameter along the contour.

According to some embodiments of the invention the contour variation rule is defined over the cross-section according to a Cartesian or polar coordinate system which is native to the additive manufacturing.

According to some embodiments of the invention the contour variation rule is defined according to one or more axes specific to the cross-section.

According to some embodiments of the invention the material selection control is configured to receive, for each contour, input pertaining to (i) a plurality of building materials to be associated with the contour, and (ii) relative amounts of the plurality of building materials. According to some embodiments of the invention the material selection control is also configured to receive (iii) a distribution rule among the plurality of building materials.

According to some embodiments of the invention the distribution rule is fixed along the contour.

According to some embodiments of the invention the material selection control is configured to receive a modulation rule for modulating the distribution rule along one or more axes of the contour.

According to some embodiments of the invention the method comprises storing in the computer storage a data structure which describes the input from the material selection control independently from the data structure of the planar pattern.

According to some embodiments of the invention the method comprises storing in the computer storage a data structure which describes a single contour of the planar pattern independently from the data structure of the planar pattern.

According to some embodiments of the invention the GUI comprises an edge blending control, wherein the method comprises displaying two adjacent contours such that graphical representations of building materials of the adjacent contours gradually vary at an interface between the adjacent contours, wherein the data structure describing the planar pattern describes a gradual variation in amounts of the building materials of the adjacent contours that corresponds to the variation in the graphical representations.

According to some embodiments of the invention the GUI comprises a contour repetition control, and the method comprises, upon activation of the contour repetition control, displaying at least one additional contour which is nested within other contours of the planar pattern, the at least one additional contour being a duplicate of a contour of the other contours, except smaller in size.

According to some embodiments of the invention the pattern shaping control is configured to allow overlap among contours, wherein the GUI comprises a contour hierarchy control, wherein the method comprises constructing the data structure such that each overlap between overlapping contours is associated with one of the overlapping contours based on input received by the contour hierarchy control.

According to some embodiments of the invention the planar segment selector control is configured to receive input pertaining to a plurality of planar segments, wherein the data structure describing the planar pattern comprises data associating a different planar pattern to each planar segment of the plurality of planar segments.

According to some embodiments of the invention the GUI comprises a property display area, wherein the method comprises predicting a property of at least one contour of the nested contours and displaying the predicted property on the property display area.

According to an aspect of some embodiments of the present invention there is provided a method of additive manufacturing. The method comprises: executing the method as delineated above and optionally and preferably as further detailed below, receiving computer object data defining a shape of a three-dimensional object, and loading the data structure from the computer storage. The method also comprises slicing the computer object data into a plurality of slices, each defined over a plurality of voxels, and assigning for each voxel of each slice, a building material according to a planar pattern that is described by the data structure and that contains the voxel. The method also comprises transmitting the plurality of slices to a controller of an additive manufacturing system for additive manufacturing of a plurality of layers respectively corresponding to the plurality of slices.

According to some embodiments of the invention the planar segment is parallel to the slices and the method comprises patterning all the slices according to the planar pattern.

According to an aspect of some embodiments of the present invention there is provided a computer software product, comprising a computer-readable medium in which program instructions are stored, which instructions, when read by a data processor, cause the data processor to execute the method as delineated above and optionally and preferably as further detailed below.

According to an aspect of some embodiments of the present invention there is provided a method of additive manufacturing. The method comprises: receiving computer object data defining a shape of a three-dimensional object, and loading from a computer storage a plurality of data structures and a hierarchy among the data structures. The data structures describe different planar patterns, each associated with a different range of positions across the object, wherein at least two of the ranges partially overlap. The method also comprises slicing the computer object data into a plurality of slices, each defined over a plurality of voxels, and assigning for each the voxel of each slice, a building material according to a planar pattern that is described by a specific data structure of the data structures that contains the voxel, and transmitting the plurality of slices to a controller of an additive manufacturing system for additive manufacturing of a plurality of layers respectively corresponding to the plurality of slices.

According to some embodiments of the present invention the assigning operation comprises, for each voxel within the overlap, selecting the specific data structure from the plurality of data structures according to the hierarchy.

According to an aspect of some embodiments of the present invention there is provided a system for encoding data for additive manufacturing. The system comprises: a display device, a computer, and a computer storage. The computer comprises a processor configured to display on the display device a graphical user interface (GUI) having at least a planar segment selector control, a pattern shaping control, and a material selection control. The processor is also configured to receive input pertaining to a selection of a specific planar segment via the planar segment selector control. The processor is also configured display on the GUI a cross-section of a three-dimensional object at a position corresponding to the specific planar segment. The processor is also configured to receive an input pertaining to shapes of nested contours via the pattern shaping control and an input pertaining to building materials associated with the contours via the material selection control. The processor is also configured to display over the displayed cross-section a planar pattern having the nested contours, and to generate and store in the computer storage a data structure describing the planar pattern.

According to an aspect of some embodiments of the present invention there is provided a method of encoding data for additive manufacturing of a three-dimensional object in layers perpendicular to a vertical direction. The method comprises: loading from a computer storage computer object data describing the three-dimensional object. The method also comprises loading from a computer storage a data structure describing a planar pattern defined over a plane that forms a non-zero angle with the layers, the planar pattern having a plurality of nested contours. The method also comprises slicing the computer object data into a plurality of slices, each defined over a plurality of voxels, and describing one of the layers, and assigning for each voxel of each slice, a building material according to a planar pattern that is described by the data structure and that contains the voxel.

According to some embodiments of the invention the method comprises loading into a graphical user interface an image of a cross-section of the three-dimensional object, and superimposing the planar pattern over the cross-section.

According to an aspect of some embodiments of the present invention there is provided a method of additive manufacturing. The method comprises executing the method as delineated above and optionally and preferably as further detailed below, and transmitting the plurality of slices to a controller of an additive manufacturing system for additive manufacturing of the layers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
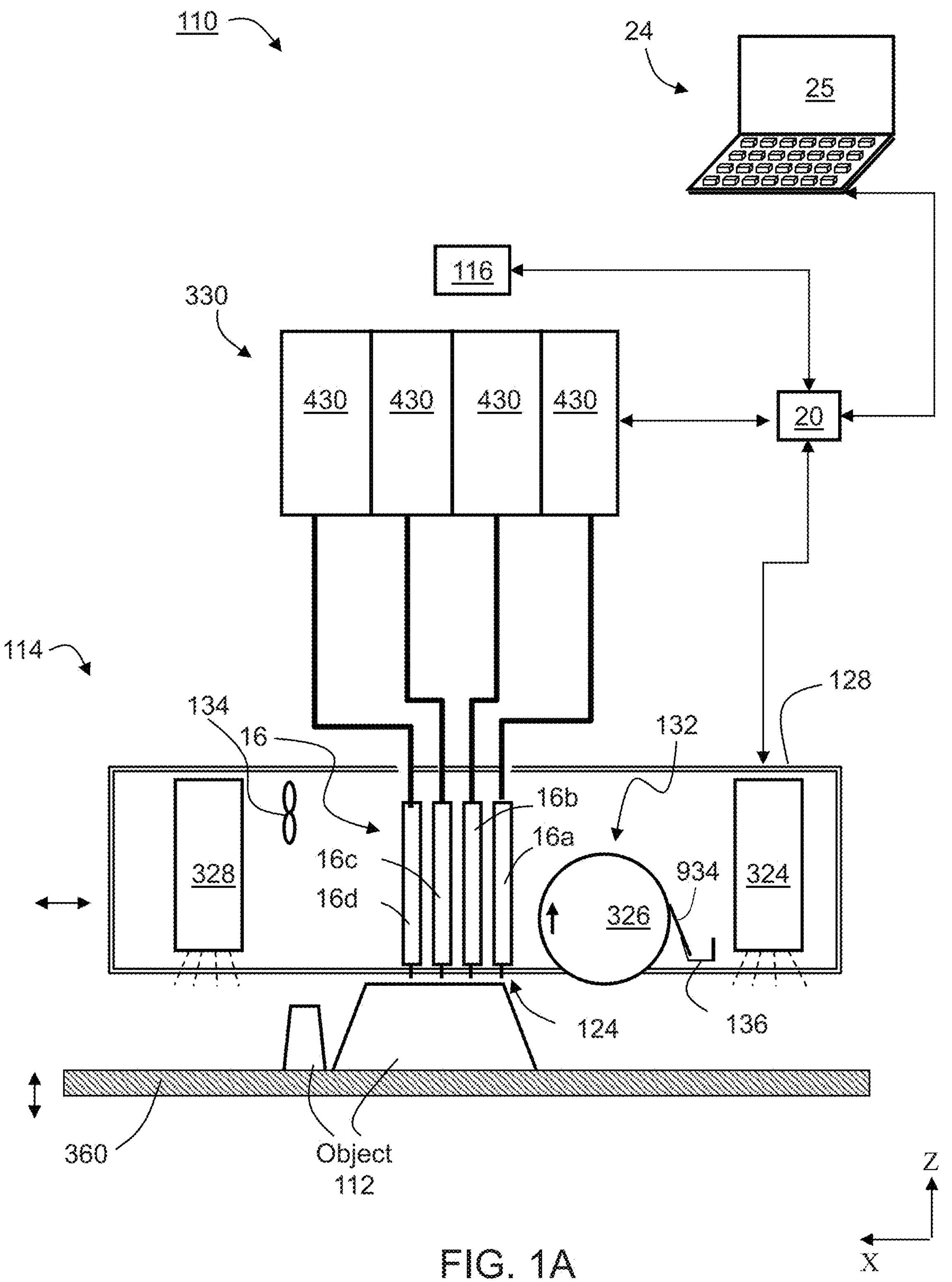
FIGS. 1A-D are schematic illustrations of an additive manufacturing system according to some embodiments of the invention.

The present invention, in some embodiments thereof, relates to additive manufacturing and, more particularly, but not exclusively, to a method and a system for encoding data for additive manufacturing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The formation of the layers is optionally and preferably by printing, more preferably by inkjet printing. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole three-dimensional object or a part thereof. The present embodiments contemplate several types of object parts. In the simplest case, a "part" of the object is an external part, in which case the volume V of the three-dimensional space enclosed by the outer surface of the object is the sum of the volume V1 enclosed by the outer surface of the part of the object, and the volume V2 enclosed by the outer surface of the object excluding that part. An example of an external part is an external wall or a cover or a structure that is connected to the outer surface of the object. A part of the object can also be an internal part of the object, in which case the volume V of the three-dimensional space enclosed by the outer surface object equals the volume V2 enclosed by the outer surface of the object excluding that part. In other words, an internal part is a structure that is completely embedded within the three-dimensional space enclosed by the outer surface of the object. A third type of part is a part that is partially internal and partially external. In this case, the sum of the volume V1 enclosed by the outer surface of the part of the object, and the volume V2 enclosed by the outer surface of the object excluding that part is larger than the volume V of the three-dimensional space enclosed by the outer surface of the object.

Figure 10A:
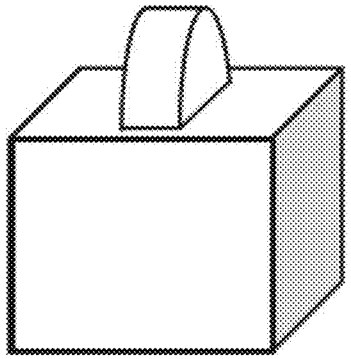
FIGS. 10A-C are schematic illustrations of an object which is defined as an assembly of two shells, according to some embodiments of the present invention.
Figure 10B:
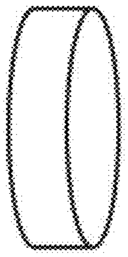
Figure 10C:
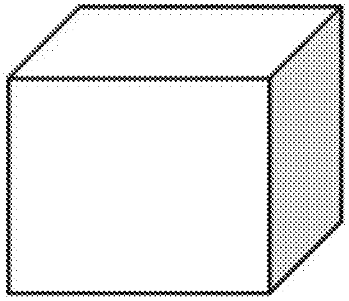

The computer object data can describe the object as a whole, or the data can be structured in a manner that allows extracting a separate geometrical definition for each of a plurality of parts of the object. A part of the object for which the computer object data allows extracting a separate geometrical definition of that part is referred to herein as "a shell." The computer object data can thus be structured to define the object as an assembly of shells, where each shell is an internal, an external, or a partially external partially internal part of the object. A representative example of an object which is defined as an assembly of two shells is illustrated in FIG. 10A, and the two individual shells are illustrated in FIGS. 10B and 10C.

Each layer can be formed by an AM apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a supporting structure. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels separated from each other, wherein each channel receives a different building material through a separate inlet and conveys it to a different array of nozzles.

Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are located in separate printing heads.

Figure 2A:
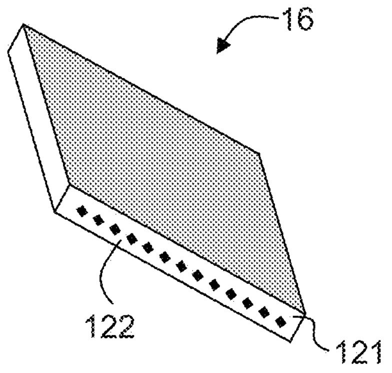
FIGS. 2A-2C are schematic illustrations of printing heads according to some embodiments of the present invention.
Figure 2B:
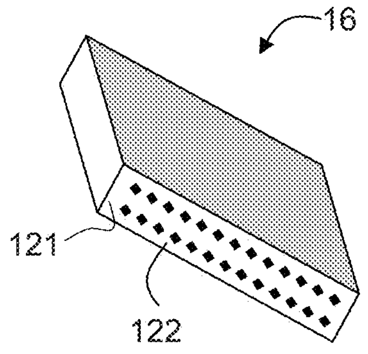
Figure 2C:
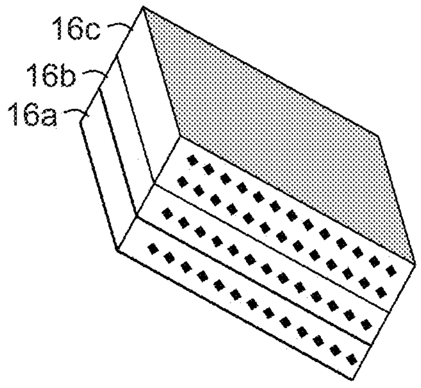

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material formulation 124 is dispensed.

Preferably, but not obligatorily, apparatus 114 is a three-dimensional printing apparatus, in which case the printing heads are preferably inkjet printing heads, and the building material formulation is dispensed via inkjet technology. This need not necessarily be the case, since, for some applications, it may not be necessary for the additive manufacturing apparatus to employ three-dimensional inkjet printing techniques. Representative examples of additive manufacturing apparatus contemplated according to various exemplary embodiments of the present invention include, without limitation, fused deposition modeling apparatus and fused material formulation deposition apparatus.

Each printing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Optionally, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16*a*, 16*b*, 16*c* and 16*d* are illustrated. Each of heads 16*a*, 16*b*, 16*c* and 16*d* has a nozzle array. In this Example, heads 16*a* and 16*b* can be designated for modeling material formulation/s and heads 16*c* and 16*d* can be designated for support material formulation. Thus, head 16*a* can dispense one modeling material formulation, head 16*b* can dispense another modeling material formulation and heads 16*c* and 16*d* can both dispense support material formulation. In an alternative embodiment, heads 16*c* and 16*d*, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein throughout the term "about" refers to ±10%.

For example, for a=1, the overall dispensing rate of support material formulation is generally the same as the overall dispensing rate of the modeling material formulation when all the arrays of nozzles operate.

Apparatus 114 can comprise, for example, M modeling heads each having m arrays of p nozzles, and S support heads each having s arrays of q nozzles such that $M \times m \times p = S \times s \times q$. Each of the $M \times m$ modeling arrays and $S \times s$ support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 32, e.g. a roller 326. Leveling device 326 serves to straighten, level and/or establish a thickness of the newly formed layer prior to the formation of the successive layer thereon. Leveling device 32 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 32, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

The present embodiments contemplate use of a liquid material formulation supply system 330, which comprises one or more liquid material containers or cartridges 430, and which supplies the liquid material(s) to printing heads. Supply system 330 can be used in an AM system such as system 110, in which case the liquid material in each container is a building material.

A controller 20 controls fabrication apparatus 114 and optionally and preferably also supply system 330. Controller 20 typically includes an electronic circuit configured to perform the controlling operations. Controller 20 preferably communicates with a computer 24 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material formulation in the respective printing head or respective nozzle array.

Once the manufacturing data is loaded to controller 20 it can operate without user intervention. In some embodiments, controller 20 receives additional input from the operator, e.g., using computer 24 or using a user interface 116 communicating with controller 20. User interface 116 can be of any type known in the art, such as, but not limited to, a keyboard, a touch screen and the like. For example, controller 20 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
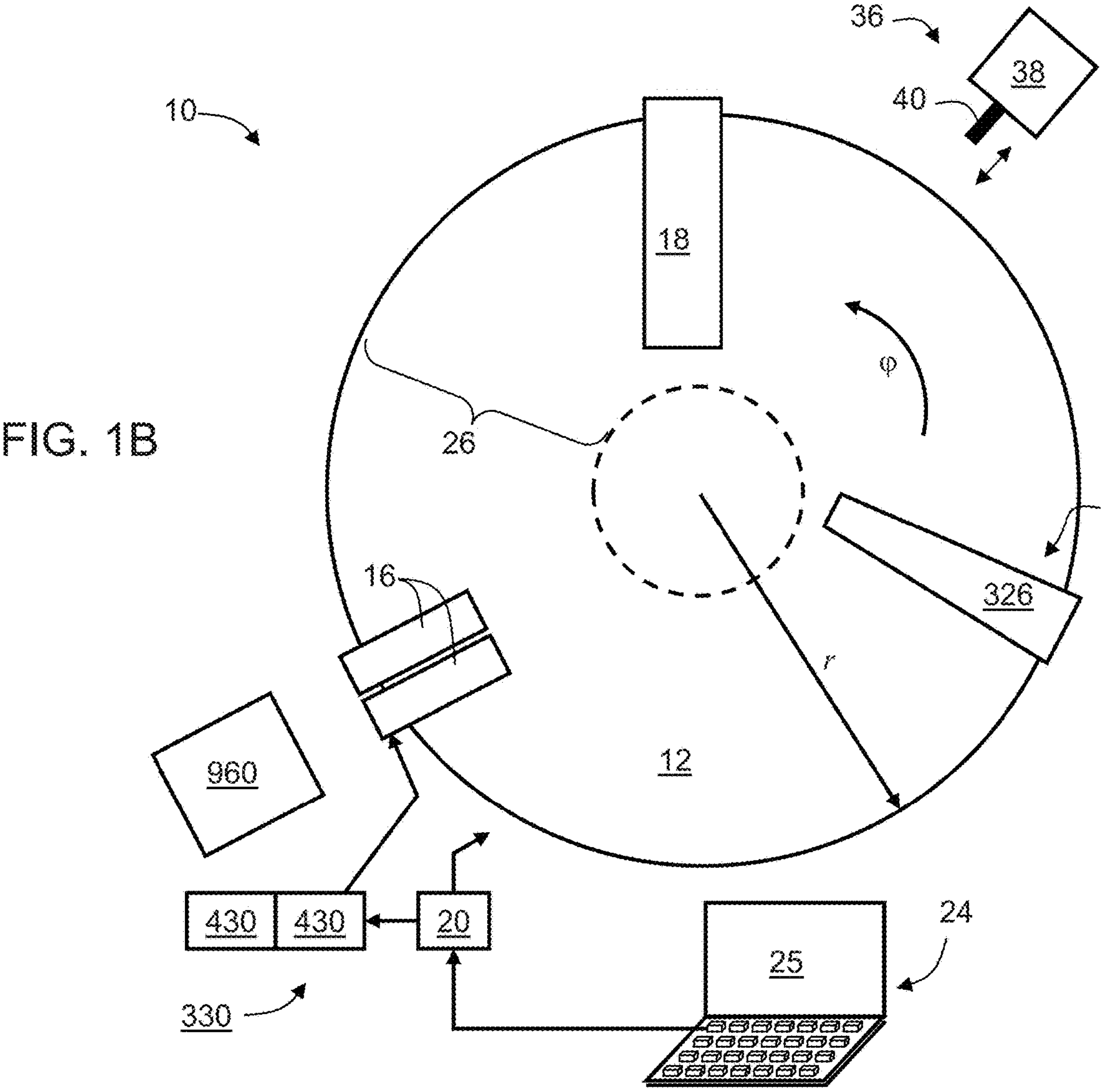
Figure 1C:
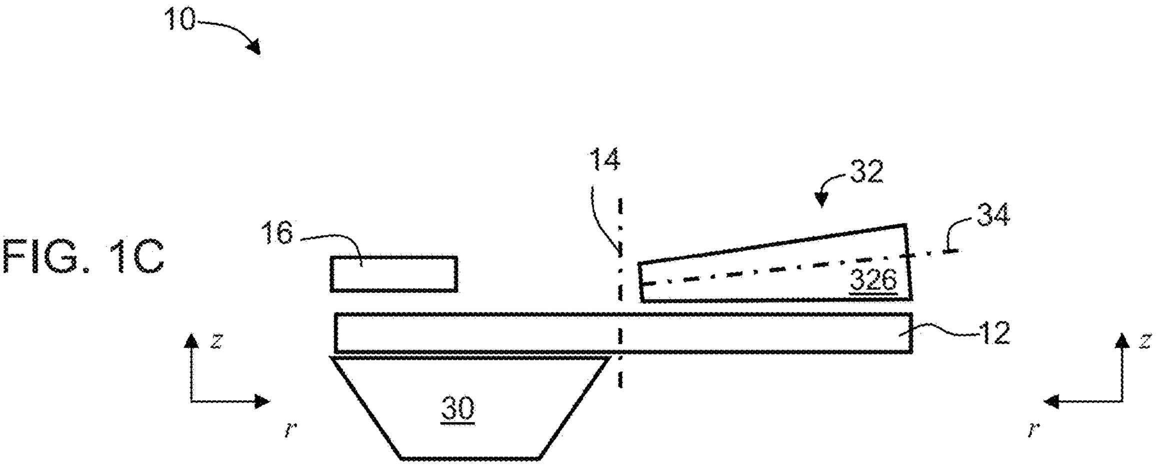
Figure 1D:
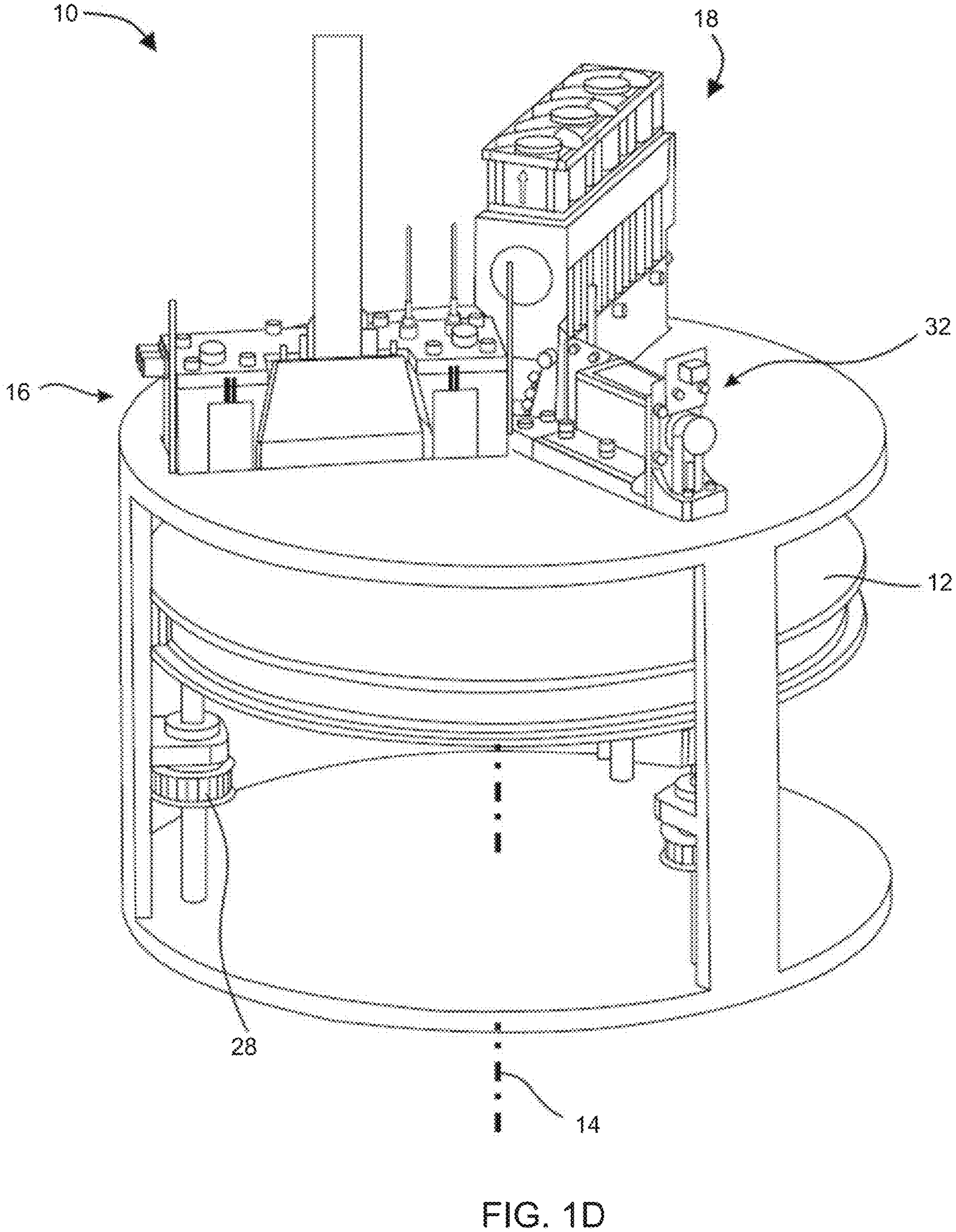

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by building material supply system 330, with one or more liquid material containers or cartridges 430, as further detailed hereinabove. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. Printing head 16 is fed by a liquid material and dispenses it through the nozzle arrays 22, in response to a voltage signal applied thereto by the controller of the printing system. Head 16 is fed by a liquid material which is a building material formulation.

In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16*a*, 16*b*, 16*c* is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
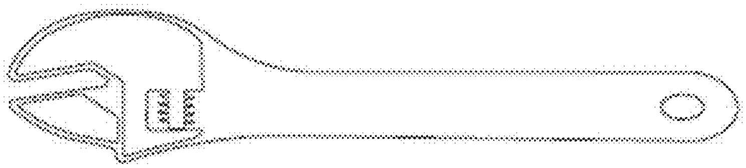
FIGS. 3A and 3B are schematic illustrations demonstrating coordinate transformations according to some embodiments of the present invention.
Figure 3B:
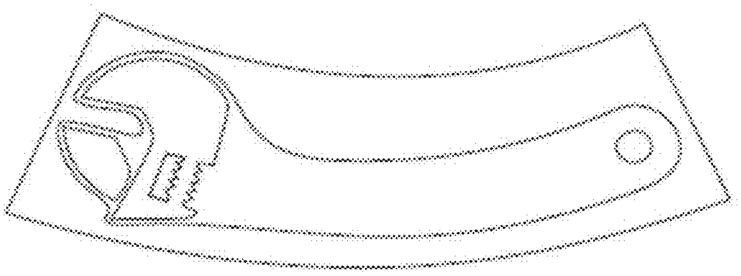

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller 326 or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

In some embodiments of the present invention the system dispenses digital material formulation for at least one of the layers.

The phrase "digital material formulations", as used herein and in the art, describes a combination of two or more material formulations on a pixel level or voxel level such that pixels or voxels of different material formulations are interlaced with one another over a region. Such digital material formulations may exhibit new properties that are affected by the selection of types of material formulations and/or the ratio and relative spatial distribution of two or more material formulations.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

Conventional AM systems allow the operator to select an outer shape of the object to be manufactured, for example, by means of appropriate software, e.g., CAD software or the like. The software typically generates computer object data in the form of graphic elements (e.g., a mesh of polygons, non-uniform rational basis splines, etc.) defining a surface of the object. The graphic elements are processed by a computer which employs software known as "a slicer" that transforms the graphic elements to a grid of voxels that define the internal shape of the object, and that are arranged as a plurality of slices, each comprising a plurality of voxels describing a layer of the 3D object. Some known AM systems provide some control over the interior of the object. For example, in International Publication No. WO2019/021295 supra, an object that mimics the shape of a bone, may include optional regions that mimic a bone tumor, a cartilage, a nerve, a spinal cord, and the like.

The Inventors found that while such systems are advantageous over systems that do not provide any control on the interior of the object, the control is only partial since it is based on a closed list of possible interior designs that has been prepared in advance by the manufacturer of the AM system, and therefore does not provide the end user with a full control on the internal structure of the object.

In a search for an improvement to existing AM systems, the Inventors found that it would be advantageous to provide the end-user with a better control on the internal structure of the object to be fabricated, and in particular to provide the end-user with an improved control on the structure of individual slices produced by the slicer software.

The present embodiments thus provide a design tool that allows the end-user to design a pattern, e.g., a freeform pattern, for one or more individual slices, hence to control the structure of the individual layers to be fabricated. Design data describing the designed pattern of a specific slice are optionally and preferably arranged as a data structure, which is then saved into a computer-readable storage medium, typically in the form of one or more computer files, each describing a designed pattern or a collection of designed patterns of one or more specific slices.

The slicer software preferably accesses the storage medium and uses the data structure to generate AM instructions for the slices based on the pattern or patterns in the data structure. Specifically, slicer software assigns for each voxel of each slice, a building material according to the pattern that is described by the data structure and that contains the respective voxel. The AM instructions for each slice are transmitted by the computer (e.g., computer 24) to the controller (e.g., controller 20) which transmits control signals to the AM system to fabricate a layer according to the AM instructions, thus providing a layer that is structured according to the end-user's design. This is advantageous over conventional AM systems since instead of requiring the end-user to select an internal design of the object collectively, the AM system fabricates user-designed individual layers.

The design tool of the present embodiments uses a graphical user interface (GUI) which is displayed by a computer, e.g., computer 24, on a display device, e.g., display device 25 of computer 24, or user interface 116. The GUI provides an easy to use interface between the end-user of the AM system and the computer. The GUI includes a plurality of computer-generated objects, which are referred to as "GUI controls", or in more abbreviated term "controls." Representative examples of GUI controls suitable for the present embodiments include, without limitation, a slider, a dropdown menu, a combo box, a text box and the like.

The GUI controls are responsive to physical operations performed by the user by means of devices that communicate signals to the computer. Such devices can be a computer mouse, a touch screen, a keyboard or the like, and may optionally include a microphone in which case the computer is configured to execute voice-activated software. The GUI can optionally and preferably display additional information, such as non-interactive text and graphics.

During operation, the end-user can select and activate the controls in order to initiate operations to be executed by the processor of the computer. The GUI transmits activation signals to the processor, for example, by means of an I/O circuit configured to communicate signals between the GUI and the processor. The activation signals can be transmitted to the processor either upon activation of the respective control, or at a later time (e.g., upon activation of another control). The controls are represented on the GUI as graphical elements that are optionally and preferably labeled in a manner that is indicative of the operation that the processor executes responsively to the activation of these controls. The controls may be arranged in predefined layouts, or may be created and/or removed dynamically responsively to specific actions being taken by the end-user by means of other GUI controls. By way of example, a user may select a button that opens or closes another control, expands a control, displays an image, and/or switches between GUI layouts (oftentimes referred to as GUI screens).

The GUI of the present embodiments receives from the end-user, by means of the GUI controls, input pertaining to a pattern, e.g., a freeform pattern, for one or more individual slices. Responsively to activation of one or more of the GUI controls, the I/O circuit of the computer communicates signals pertaining to this input from the GUI to the processor, and the processor converts those signals to digital design data describing the designed pattern. The processor arranges the design data as a data structure, and saves it into a computer-readable storage medium.

A representative example of a GUI 500 suitable for the present embodiments is illustrated in FIGS. 4A-D. GUI 500 comprises a planar segment selector control 502, and a pattern design area 504. Planar segment selector control 502 allows the end-user to select a specific planar segment for which a planar pattern is to be designed by the end-user, as further detailed hereinbelow. Planar segment selector control 502 can be in the form of a slider control, as illustrated in FIGS. 4A-D, or it can be in other forms such as, but not limited to, a text box or a dropdown menu, as desired. Combinations of these types of GUI controls are also contemplated. Thus, control 502 can be a single GUI control or it can include a set of two or more GUI controls.

In various exemplary embodiments of the invention selector control 502 allows the end-user also to select a direction, for example, by means of a dropdown menu 502*a*, wherein the selected planar segment is perpendicular to the selected direction. In the schematic illustrations of FIGS. 4A-D, which are not to be considered as limiting, the selected direction is the z direction, so that the selected planar segment is perpendicular to the z direction (e.g., parallel to the layers that are eventually formed by the AM system). However, this need not necessarily be the case, since, for some applications, it may not be desired for the selected planar segment to be perpendicular to the z direction. For example, the end-user can select, e.g., using menu 502*a*, the y direction or the x direction. Also contemplated are embodiments in which control 502 allows selecting a direction that is not one of the three native orthogonal directions of the AM system, e.g., a direction that is not orthogonal to at least one of the x-, the y-, and the z-directions (in a Cartesian AM system, e.g., system 110), or at least one of the r-, the φ-, and the z-directions (in a rotational AM system, e.g., system 10.

Also contemplated are embodiments in which GUI 500 comprises multiple screens (not shown) each allowing the end-user to select a different direction for the planar segment and thus define planar patterns across multiple non-parallel planes within the object. The multiple screens can be identical to each other in terms of the various controls displayed thereon. The multiple screens can be displayed simultaneously (e.g., side by side) or serially, in which case the GUI 500 may comprise a screen selector 501, for allowing the end-user to instruct GUI 500 which screen to display.

Planar segment selector control 502 can allow the end-user to either specify the segment's serial number (serial number 2000 is exemplified in FIGS. 4A-D), or to specify the position of the planar segment along a selected direction.

A cross-section 510 of a three-dimensional object 512 at a vertical position that corresponds to the selected planar segment is displayed, preferably in response to any change' in a state of control 502, in a visualization area 514 of GUI 500. GUI 500 can comprise a cross-section display control 503 that allows the user to select the plane over which cross-section 510 is taken and displayed in visualization area 514. Control 503 can optionally and preferably be configured to display several cross-sectional views of the object where different cross-sections are taken over different planes which can be parallel or non-parallel to each other. Different cross-sectional views of the object can be displayed in the same visualization area 514, in different visualization areas 514 shown side-by-side, or on different screens of GUI 500. Control 503 can also allow to combine cross-sectional views for visualization.

In the exemplified illustration shown in 4A-D, which is not to be considered as limiting, the object 512 is a synthetic image of a human heart. A planar pattern designed for a specific planar segment (e.g., segment No. 2000, as illustrated in FIGS. 4A-D) can be employed also in other planes of the three-dimensional object. For example, a particular designed planar pattern can be employed to a stack of planar segments, or to all the planar segments of the three-dimensional object 512. By changing the selection of the planar segment using control 502 the end-user can be provided with a view of the same pattern as employed in other planar segments of object 512.

While FIGS. 4A-D illustrate embodiments in which patterns are designed for a single object, this need not necessarily be the case, since, in some embodiments, it may be desired to design patterns for more than one object or more than one shell of an object. These embodiments are particularly useful when more than one object with the same and/or different structures are to be printed, or when an object defined as an assembly of multiple shells is be printed. When it is desired to design patterns for more than one object, or, to design patterns separately for two or more shells of the object, the shape of more than one object or more than one shell of the same object, as the case may be, is loaded and displayed in visualization area 514. When visualization area 514 displays different objects, the AM system ultimately fabricate these objects on the tray of the AM system at laterally displaced locations. When visualization area 514 displays different shells of the same object, the AM system ultimately fabricate the object on the tray of the AM system based on the relative locations of the shells within the assembly, as defined in the computer object data.

Pattern design area 504 comprises a pattern shaping control 506, and a material selection control 508, wherein each of controls 506 and 508 can be a single GUI control or a set of two or more GUI controls, as further detailed hereinbelow. A planar pattern is typically defined as one or more sets of nested contours, and pattern shaping control 506 allows the end-user to define the number of nested contours, by means of a contour list control 516, and to define the geometrical properties of each contour, by means of a contour shape and size control 518. In some embodiments of the present invention pattern shaping control 506 also allows the user to select or define a texture to be applied to the contour by means of a contour texture control 519. Contour texture control 519 can allow the end-user to select a pattern to any of the nested contours, including contours that are on the outermost surface of the object, and/or contours that are internal with respect to the outermost surface of the object. The designed planar pattern including the nested controls is displayed over the cross-section 510 in a superimposed manner. A representative example of one of the contours of a planar pattern is shown at 600. Typically, contour list control 516 includes a contour addition activation button 516*a*. Upon activation of button 516*a* the list of contours in contour list control 516 is increased by one contour.

Upon selection of a contour in contour list control 516, the shape and size of the respective contour can be set using contour shape and size control 518. The end-user can also select a human-readable name for the respective contour, e.g., using a textbox control 520.

The shape and size of a contour (e.g., contour 600) can be provided in more than one way. In some embodiments, the contour is defined based on one or more contour shape parameters measured relative to a geometrical feature of the respective planar segment. In the embodiments illustrated in 4A-D, which are not to be considered as limiting, control 518 includes a pair of textboxes or spin buttons that allow the end-user to enter the distances $d_1$, $d_2$ of the outer and inner boundaries of the contour from the boundary of object 512, respectively. These two distance parameters set the shape of the contour (according to the shape of the periphery of cross-section 510 at the vertical position of the respective planar segment), the size of the outer boundary of the contour (according to the user-selected distance $d_1$), and the width of the contour as measured in the plane of the planar segment (according to the difference between the two user-selected distances $d_1$, $d_2$).

Other contour shape parameters that define the contour's shape and size are also contemplated. For example, instead of defining the contour using the distances $d_1$, $d_2$, the contour can be defined by the distance $d_1$ (between the outer boundary of the contour and the boundary of object 512) and the width of the contour. Further contemplated are embodiments in which the end-user is allowed to define the contour as a freeform object independently of the shape of the boundary of the planar segment. For example, GUI 500 can include a GUI option button 522 such that upon activation of button 522 the end-user can draw a freeform contour over the cross-section 510.

The advantage of defining the contour based on one or more parameters measured relative to a geometrical feature of the respective planar segment is that it is easier to automatically adapt the shape and size of the contour to other planar segments of the same object or to one or more planar segments of a different object. The advantage of defining the contour as a freeform shape, is that it increases the number of possibilities to pattern the planar segment.

Contour texture control 519 can be in the form of a dropdown menu to allow the end-user to select a texture to be applied from a list of available textures. Contour texture control 519 can alternatively or additionally activate a file selection dialog (not shown) allowing the end-user to use an image that stored as a computer file as a texture to be applied to the counter.

Material selection control 508 allows the end-user to select the building material (modeling and/or support) from which the contour is to be formed by the AM system. Thus, once the data structure that includes the design data is read by the slicer software, the slicer software allocates the materials for each voxel that belongs to the respective contour of the planar segment based on the material(s) that are selected by the end-user using control 508. Control 508 can be in the form of one or more dropdown menus allowing to select the material from a predefined list of materials. Preferably, GUI 500 comprises a material information area 524 that displays the types of building materials that are currently loaded to the system. This can be achieved by transmitting an interrogating signal to the AM system (e.g., to controller 20), and responsively receiving a signal pertaining to the types of building materials that are currently loaded to the AM system. Typically, the interrogating signal is transmitted automatically by the computer immediately after the loading of GUI 500. Preferably, material selection control 508 is configured to allow selection only among the types of building materials that are currently loaded to the system. For example, materials that are not currently loaded into the AM system can be grayed out in the dropdown menu of control 508. When the materials that are currently loaded into the AM system include a material that remains in its liquid state at room temperature after curing or a non-curable material, control 508 can allow the end-user also to select this type of material.

Material information area 524 can optionally and preferably also display an indication regarding the materials that are already in use for the designed planar pattern.

GUI 500 can, in some embodiments of the present invention be configured to generate digital design data that includes diluted patterns in which some of the voxels are no occupied by building material. This can be done by means of material selection control 508. In these embodiments, control 508 allows the user to select an option in which the design patterns are diluted. For example, one of the materials that are selectable in control 508 can be air, so that a particular pattern can be designed as a digital mixture including both voxels that are occupied by building materials, and void voxels.

Figure 4A:
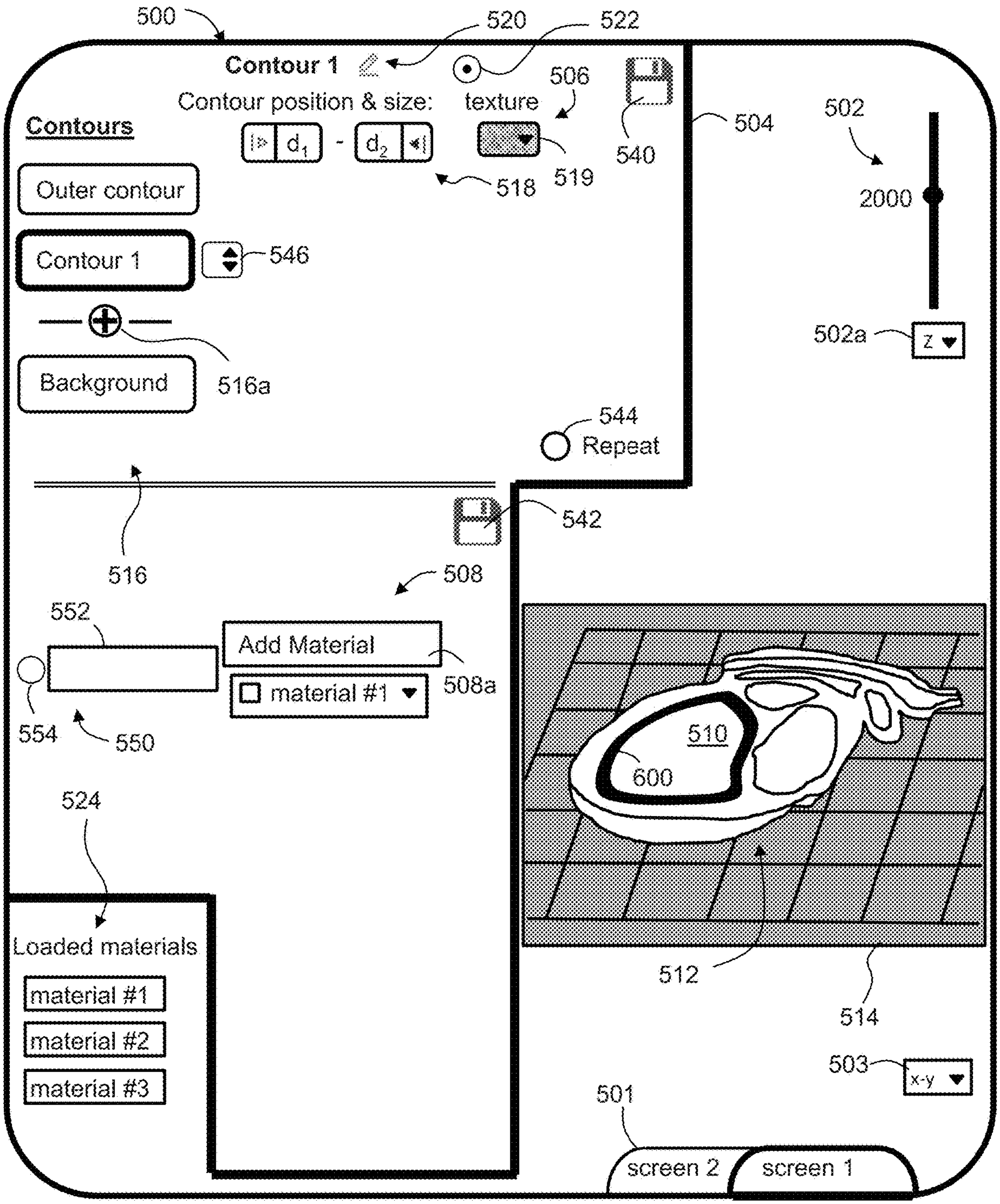
FIGS. 4A-D are schematic illustrations of a graphical user interface (GUI), according to some embodiments of the present invention.
Figure 4B:
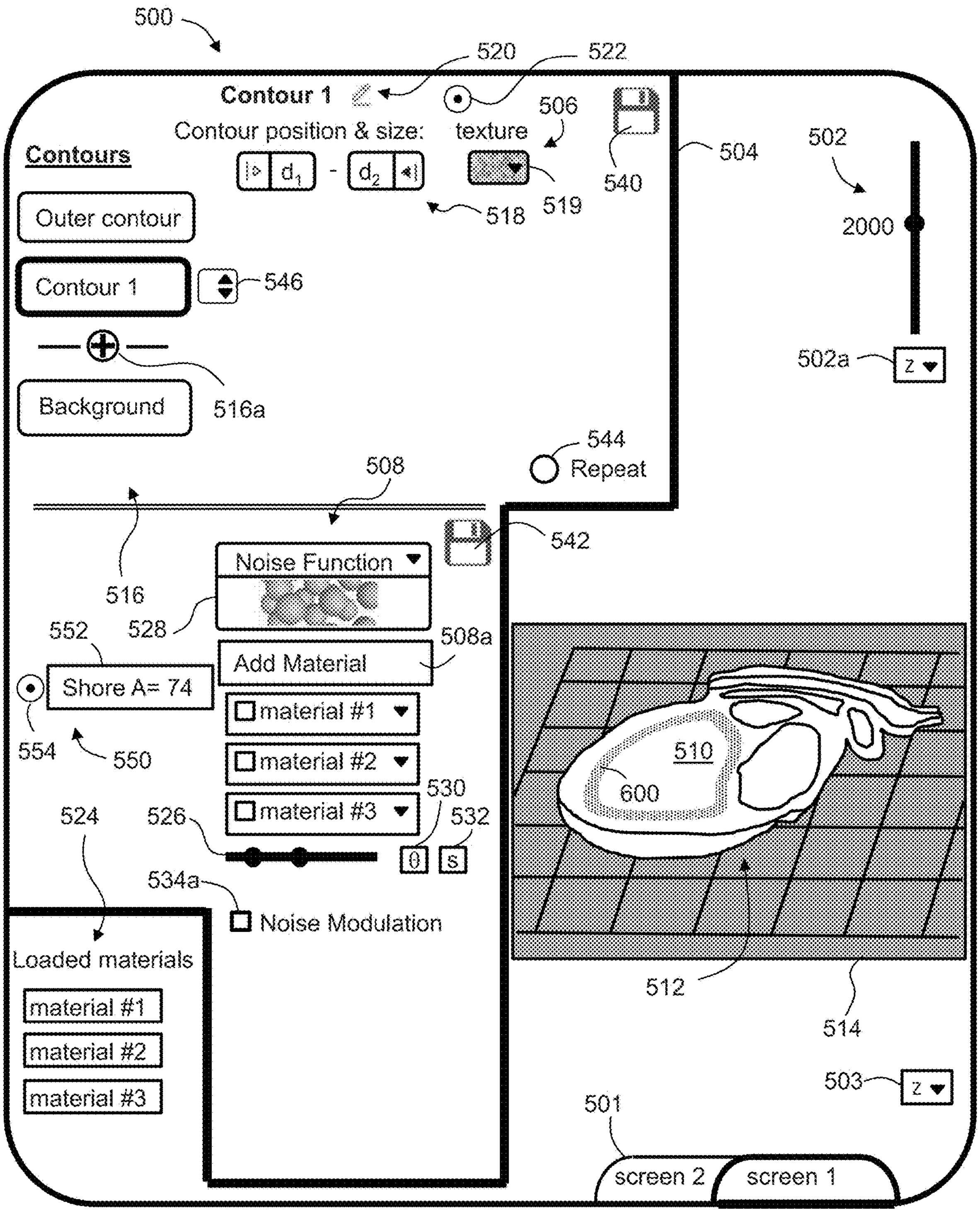

Material selection control 508 is optionally and preferably configured to allow selecting one or more building materials for any of the contours. For example, material selection control 508 can include a material addition activation button 508*a*, so that upon activation of button 516*a* the number of dropdown menus in control 508 is increased by one menu allowing to select another material for the respective contour. FIG. 4B illustrates a case in which material addition activation button 508*a* has been activated twice, resulting in two additional material selection dropdown menus.

When a single material is selected for a particular contour, the slicer software allocates the selected material to all the voxels that belong to the contour (as defined geometrically by means of control 518). The illustration of FIG. 4A represents a case in which contour 600 is defined to be formed using a single building material.

The illustration of FIG. 4B represents a case in which contour 600 is defined to be formed using more than one building material. When more than one material is selected for a particular contour, for each of the selected materials, the slicer software allocates the respective material to at least one of the voxels that belong to the contour. In operation, the AM system dispenses a digital material formulation to form the respective contour based on this allocation of materials. In some embodiments of the present invention material selection control 508 is also configured to receive relative amounts of the building materials that are to form the digital material of the contour. This can be achieved by a relative amount selection control 526, for example, in the form of a GUI slider control (as illustrated in FIG. 4B) and/or a GUI text box. The control 526 is optionally and preferably displayed only when two or more material selection dropdown menus are displayed (see, e.g., FIG. 4B).

In some embodiments of the present invention material selection control 508 comprises a material distribution rule control 528 for allowing the end-user to select or define, in cases in which two or more building materials are assigned to the contour, the rule according to which the materials are distributed among the voxels of the contour. The control 528 is optionally and preferably displayed only when two or more material selection dropdown menus are displayed (see, e.g., FIG. 4B). The material distribution rule control 528 can be in the form of a dropdown menu and may also include a graphical area displaying an illustration of the expected distribution for the selected rule.

The list of rules from which the end-user selects the material distribution rule optionally and preferably comprises a plurality of predetermined functions, wherein each function, once employed by the slicer software, receives input parameters describing the location of a voxel within the contour, and provides an output value, which is then used by the slicer software to probabilistically select the material for the respective voxel. In embodiments in which control 526 is employed, the relative amounts selected by control 526 are used as an additional input parameter for the selected function. The functions in the list can be noise functions, such as, but not limited to, a simplex noise function, an open simplex noise function, a Worley noise function, a Perlin noise function, a sphere scattered noise function, a wavelet noise function, a value noise function, a complex noise function (e.g., a function composition in the form of a function of a function), or the like. Representative examples of illustrations of distributions generated by a Perlin noise function, a sphere scattered noise function, a gyroid noise function, and a random noise function are illustrated in FIGS. 5A-D, respectively.

The material distribution rule control 528 can in some embodiments of the present invention allow the user to define the rule, or portion thereof, rather than to use a predetermined rule. For example, control 528 can be configured to allow the user to enter a user-defined function, or a user-defined function composition, or modify one of the predetermined functions displayed by control 528, e.g., in the aforementioned dropdown menu, when such is employed.

Material selection control 508 can in some embodiments of the present invention comprise a distribution rule rotation control 530, for allowing the end-user to select a direction θ within object 512 along which the distribution rule (e.g., noise function) is applied. The Greek letter θ symbolizes a general direction in space, which can be an in-plane direction, in which case the distribution rule is applied along a vector parallel to the planar segment, or an out-of-plane direction in which case the distribution rule is applied along a vector having at least a component perpendicular to the planar segment. Material selection control 508 can in some embodiments of the present invention comprise a distribution rule scaling control 532, for allowing the end-user to select a scale s for the sizes of the elementary unit cells generated by the selected distribution rule. Preferably, the graphical area of control 528 is responsive to the selection of the scale s, so that a change in control 532 is shown as a change in the elementary unit cells shown in the graphical area of control 528.

The end-user may optionally and preferably also select whether to apply a fixed distribution rule (as selected using control 528) for the entire contour, or to vary the distribution rule along different segments of the contour. In these embodiments, material selection control 508 comprises distribution modulation control 534, for allowing the end-user to enter a modulation rule for modulating the distribution rule along the respective contour. Typically, the control 534 is optionally and preferably displayed only after the end-user activates a distribution modulation activation button 534*b* (see, e.g., FIG. 4C).

In some embodiments of the present invention the modulation of the distribution rule is based on the distribution rule selected using control 528. In the embodiments illustrated in FIG. 4C, which are not to be considered as limiting, the control 534 is similar to control 526 (allowing to select relative amounts of the building materials), except that instead of defining the relative amounts for the entire contour, different relative amounts are defined for different segments of the contour (two segments, segment 1 and segment 2, in the present example). Control 534 can define, for each segment, a starting point and an end point or, equivalently, an end point and a segment length. Alternatively, control 534 can define only one end point for each segment, and the computer can determine the other end point of each segment based on the end point defined for the next segment.

Control 534 can include a segment addition activation button 534*a*, so that upon activation of button 534*a* the number of segments in control 534 is increased by one segment allowing to select the relative amounts for another segment of the respective contour. Preferably, the relative amounts defined using control 526 enact default relative amounts to be used for any part of the contour that is not included in the segments defined using control 534.

Figure 4C:
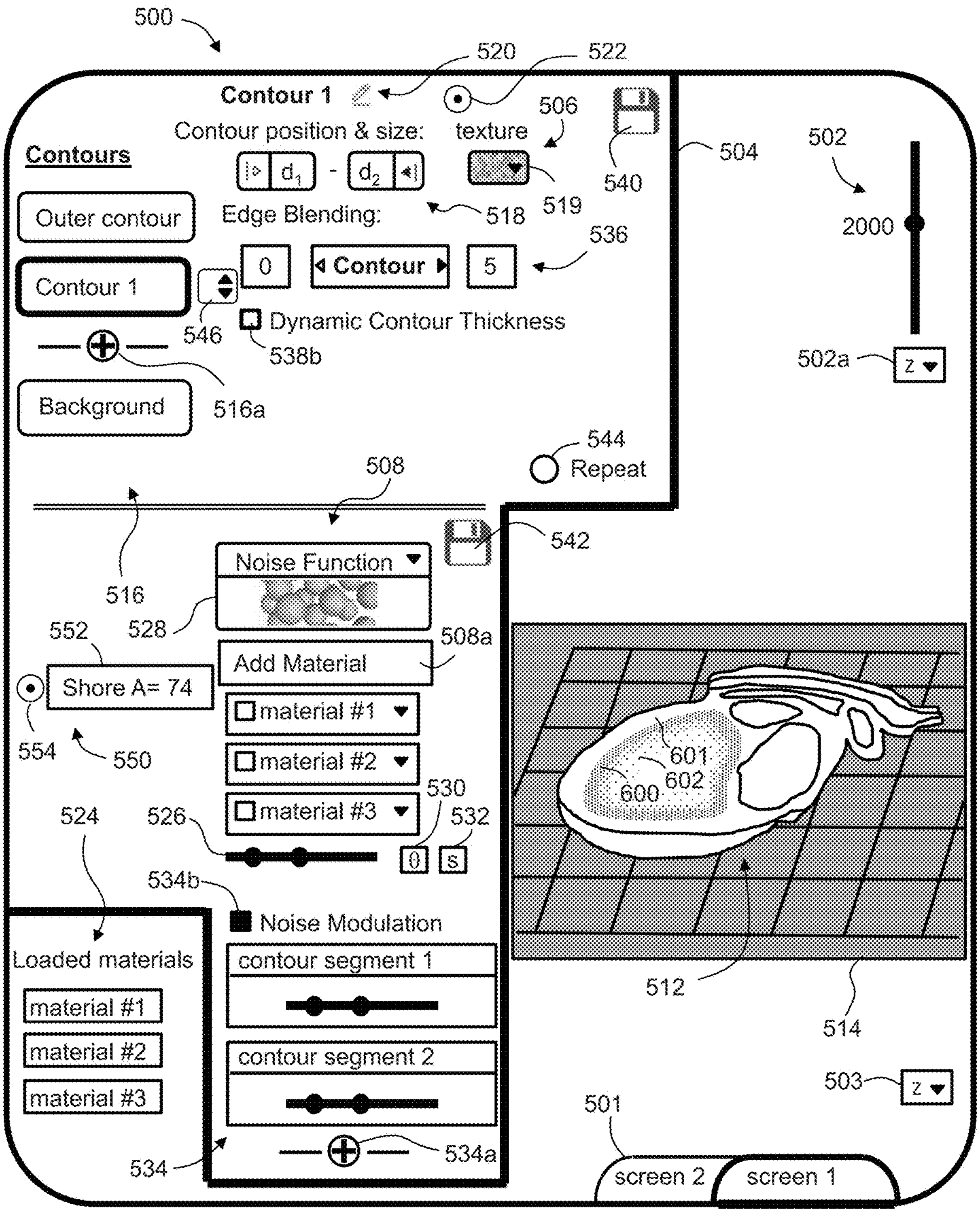

With reference to FIG. 4C, in some embodiments of the present invention pattern design area 504 of GUI 500 also comprises an edge blending control 536, for allowing the end-user to define a gradual variation between the amounts of the building materials at the interface between adjacent contours. Preferably, visualization area 514 of GUI 500 displays the respective two adjacent contours such that the graphical representations of the building materials of these contours gradually vary at the interface between them. FIG. 4C schematically illustrates a representative example of a gradual variation between contour 600 and adjacent contours 601 and 602. Edge blending control 536 can be in the form of a GUI slider and/or text box, to allow the end-user to define the portions of each of contours 600, 601 and 602 at which the gradual variation is employed. In an exemplary embodiment of the invention, control 536 can be used to define the penetration distances of the gradual variation of contour 600 into each of contours 601 and 602 as measured from the interface between adjacent contours, i.e. interface 600/601 and interface 600/602. For example, in the example shown in FIG. 4C, the gradual variation of contour 600 penetrates 5 distance units (e.g., 5 mm) into the width of contour 602, but does not penetrate (zero penetration distance) into contour 601.

The end-user may optionally and preferably also select whether to maintain the same value for the contour shape parameters that define the shape of the contour along the entire contour, or to vary one or more of these parameters along different segments of the contour. Such a selection can be by means of a shape variation activation button 538*b*, so that when button 538*b* is activated, the end-user is allowed to vary one or more of these parameters along different segments of the contour, and when button 538*b* is not activated, the same value for the contour shape parameters is maintained along the entire contour.

Figure 4D:
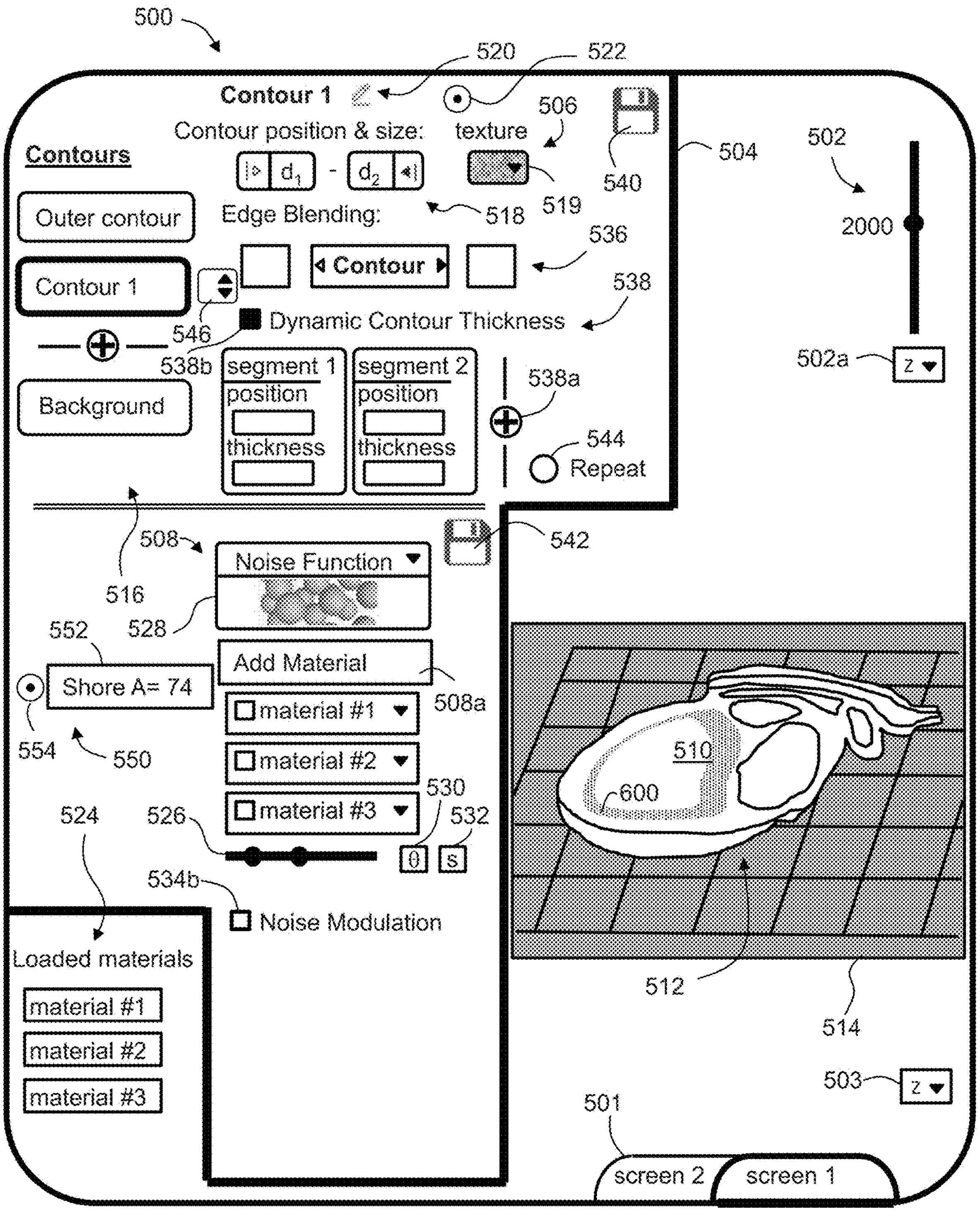
Figure 5A:
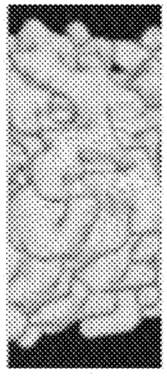
FIGS. 5A-D are schematic illustrations of distributions generated by noise functions, according to some embodiments of the present invention.
Figure 5B:
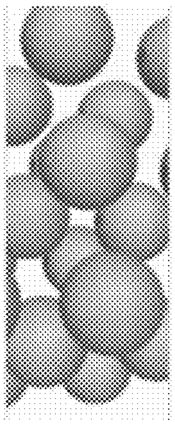
Figure 5C:
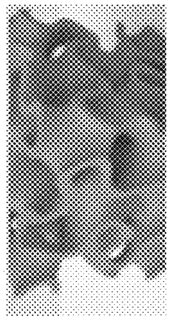
Figure 5D:
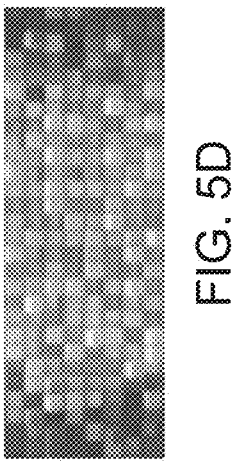

FIG. 4D illustrates GUI 500 after activation of button 538*b*. Upon activation of button 538*b*, GUI 500 displays, e.g., within pattern design area 504, a contour shape variation control 538, which allows the end-user to enter a contour shape variation rule for varying the local shape of the contour along its length. Contour shape variation control 538, can comprises a set of text boxes or spin buttons for defining different widths of the contour for different segments of the contour (two segments in the present example). Control 538 can include a contour segment addition button 538*a*, so that upon activation of button 538*a* the number of segments in control 538 is increased by one segment allowing to select the width for another segment of the respective contour. Control 538 can define, for each segment, a starting point and an end point or, equivalently, an end point and a segment length. Alternatively, control 538 can define only one end point for each segment, and the computer can determine the other end point of each segment based on the end point defined for the next segment. Preferably, the width defined using control 518 enacts a default width to be used for any part of the contour that is not included in the segments defined using control 538.

For any of controls 538 and 534, the segments of the contour can be defined in more than one way. In some embodiments of the present invention the segments are defined using a coordinate system which is native to the AM system which is to be used for fabricating the object. Thus, when system 10 is employed, the aforementioned polar coordinate system ($r$, $\varphi$) is used, and when system 110 is employed, the aforementioned Cartesian coordinate system ($x$, $y$) is used. Alternatively, the contour segment can be defined according to an axis which is specific to cross-section 510 of object 512. For example, cross-section 510 can be represented by a two-dimensional coordinate system defined over two axes $\xi$ and $\eta$, which are not necessarily orthogonal to each other and which are not necessarily parallel to any of the native direction of the AM system. Typically, but not necessarily, axis $\xi$ is defined along the longest diameter of cross-section 510. Axis $\eta$, can be defined along the shortest diameter of cross-section 510, or perpendicularly to axis $\xi$. A representative example of an embodiment in which contour segments are defined according to an axis which is specific to cross-section 510 is illustrated in FIGS. 6A and 6B.

Figure 6A:
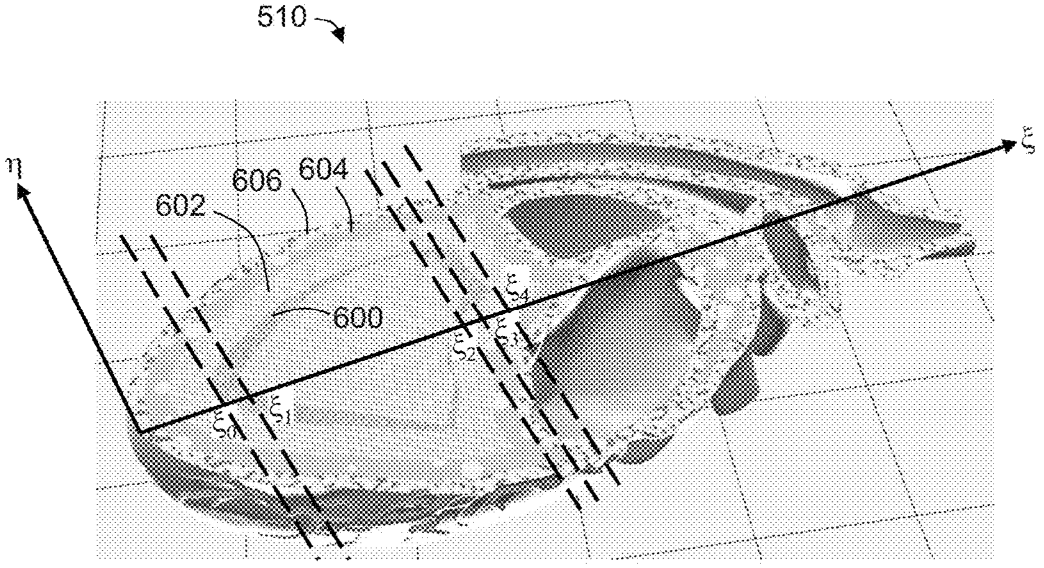
FIGS. 6A and 6B are schematic illustrations describing a technique for defining contour sequences according to some embodiments of the present invention.

FIG. 6A illustrates cross-section 510 in embodiments in which cross-section 510 is represented by a two-dimensional coordinate system defined over two axes $\xi$ and $\eta$. Shown is a pattern including several nested contours 600, 602, 604, 606, wherein the width of contour 600 varies along its length and is spanning along the $\xi$ axis from a point denoted $\xi_0$ to a point denoted $\xi_4$. Marked on axis $\xi$, are three additional positions $\xi_1$, $\xi_2$, $\xi_3$, thus defining four segments along contour 600: a first segment characterized by a $\xi$ coordinate satisfying $\xi_0 \le \xi < \xi_1$, a second characterized by a $\xi$ coordinate satisfying $\xi_1 \le \xi < \xi_2$, a third segment characterized by a $\xi$ coordinate satisfying $\xi_2 \le \xi < \xi_3$, and a fourth segment characterized by a $\xi$ coordinate satisfying $\xi_3 \le \xi \le \xi_4$. Suppose that for contour 600, control 518 defines a width $w_0$, and control 538 defines a width $w_1$ at $\xi=\xi_1$, a width $w_2$ at $\xi=\xi_2$, and a width $w_3$ at $\xi=\xi_3$. In this case, the width of contour 600 is $w_0$ for all points along contour 600 for which $\xi=\xi_0$ or $\xi=\xi_4$, and is $w_1$ for all points along contour 600 for which $\xi=\xi_i$, where i=1, 2 or 3. For all other points along contour 600 the width varies gradually (e.g., linearly) between the width values of the end points of the respective segments.

Figure 6B:
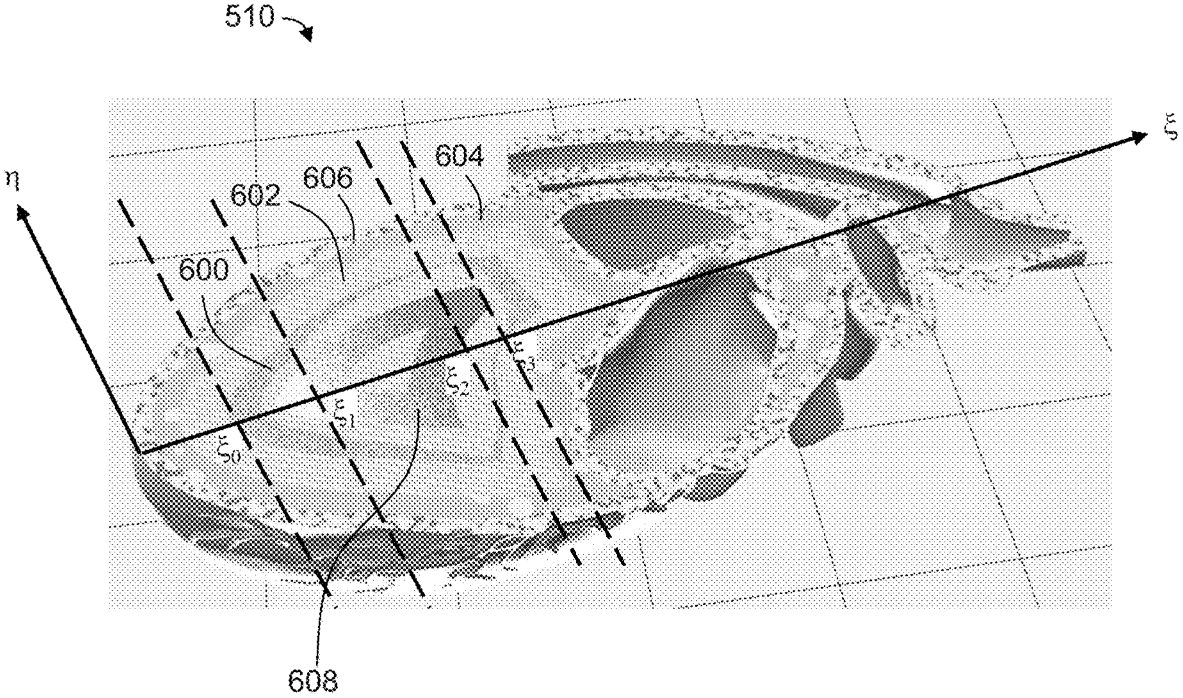

FIG. 6B illustrates the cross-section 510 of FIG. 6A after the addition of another contour 608, wherein distribution modulation control 534 has been activated for contour 608. Contour 608 spans along the $\xi$ axis from a point denoted in FIG. 6B by $\xi_0$ to a point denoted in FIG. 6B by $\xi_3$. Marked on axis $\xi$, are two additional positions $\xi_1$, and $\xi_2$, thus defining three segments along contour 608: a first segment characterized by a $\xi$ coordinate satisfying $\xi_0 \le \xi < \xi_1$, a second characterized by a $\xi$ coordinate satisfying $\xi_1 \le \xi < \xi_2$, and a third segment characterized by a $\xi$ coordinate satisfying $\xi_3 \le \xi < \xi_4$. Suppose, for simplicity, that two different materials, material A and material B, have been selected by control 508 for contour 608, and that relative amounts selection control 526 has selected relative amounts for the two materials such that the ratio between the relative amount of material A and the relative amount of material B is $R_0$. Suppose further that, for contour 608, control 534 defines the relative amounts of material A and material B such that the ratio between the relative amount of material A and the relative amount of material B is $R_1$ at $\xi=\xi_1$, and $R_2$ at $\xi=\xi_2$.

In this case, the ratio between the relative amount of material A and the relative amount of material B is $R_0$ for all points along contour 608 for which $\xi=\xi_0$ or $\xi=\xi_3$, and $R_i$ for all points along contour 608 for which $\xi=\xi_i$, where i=1 or 2. For all other points along contour 608 the ratio between the relative amount of material A and the relative amount of material B varies gradually (e.g., linearly) between the ratio values at the endpoints of the respective segments.

While FIGS. 6A and 6B show variation of the width along a particular axis $\xi$ the width can be varied along any number of axes. Thus, the above description for the $\xi$ axis can be repeated also for at least one of the $\eta$ axis and an axis perpendicular to both the $\xi$ axis and the $\eta$ axis, so that the same contour can have different widths at different locations. For example, the width can be non-uniform along at least two of the X, Y, and Z axes.

With reference again to FIGS. 4A-D, GUI 500 can optionally and preferably comprise one or more property predictor controls 550, which provide predictions of one or more expected properties of the respective defined contour. For example, predictor 550 can include a mechanical property predictor, such as, but not limited to, a hardness predictor which predicted the hardness of the contour (expressed, e.g., as a Shore A hardness). Property predictor 550 can include a display area 552 and a control selector 554, for example, an option button. When selector 554 is activated, the computer predicts the respective property and the results are displayed at area 552. The computer can calculate the prediction based on the selected building materials, and their expected distributions according to the selected noise functions and modulations. Such a prediction can be made by means of a look up table having an entry for each of a plurality of combinations of materials and material distributions. Also contemplated, are predictions made by a trained machine learning procedure which receives at its input the selected materials, noise functions, and optionally the modulations, and provides at its output the predicted property.

In various exemplary embodiments of the invention, in addition to any contour created by the end-user by activating control 516*a*, contour list control 516 comprises two default contours referred to as “Outer contour” and “Background”. The background contour preferably serves for defining the building material or building materials for each voxel of object 516 that does not belong to any of the other contours. Typically, when the end-user selects the background contour, the controls that allow defining geometrical properties (e.g., controls 518, 536, 538) are grayed out, so that the end-user can only define the materials to be allocated for all regions of the three-dimensional object 512 that do not belong to any of the other contours, using control 508, and optionally also controls 526, 528 and 534.

The outer contour preferably serves for defining a contour that begins at the periphery of cross-section 510. Typically, when the end-user selects the outer contour, the control that allows defining the outer boundary $d_1$ is set to $d_1=0$ and becomes non-interactive (e.g., grayed out), to ensure that the outer boundary of the contour coincides with the periphery of cross-section 510. Additionally, the allowed widths for the outer contour are limited from above based on predetermined constraint regarding the required thickness of the outermost shell of object 512. Thus, for example, the end-user can be prevented from entering a value for $d_2$ that is less than a predetermined threshold. Further, for the outer contour, some of the materials listed in control 508 are disallowed (e.g., grayed out), based on predetermined constraint or set of constraints regarding the required mechanical properties of the outer surface of object 512.

In some embodiments of the present invention GUI 500 comprises a control 540 for allowing the end-user to save into a computer storage a configuration of a particular contour (e.g., shape, size, association of one or more building materials to the contour), separately from the data structure that describes the entire pattern, which includes all the contours. The advantage of these embodiments is that they allow the user to construct a personal library of individual contours. Similarly, and independently, GUI 500 can in some embodiments of the present invention comprise a control 542 for allowing the end-user to save into a computer storage a particular material combination (e.g., list of materials, ratio, distribution rule), separately from the data structure that describes the entire pattern, which includes all the contours. The advantage of these embodiments is that they allow the user to construct a personal library of digital material definitions.

In some embodiments of the present invention GUI 500 comprises a contour repetition control 544. Control 544 can be in the form of a GUI option button, which, once activated, generates a nested sequence of contours in which the already defined contours are repeated in the same order and in a nested manner, beginning at the innermost contour defined by the end-user. Preferably, the repetition continues until the cross-section 510 is completely filled with contours.

The present embodiments also contemplate situations in which there are one or more overlaps among contours defined using the pattern shaping control 506. In these embodiments, the data structure that describes the pattern is constructed such that each overlap between overlapping contours is associated with one of the overlapping contours based on a hierarchy among the overlapping contours. The hierarchy can be defined by the end-user, for example, by means of a contour hierarchy control 546. Control 546 can be in the form of a spin button that provides a hierarchy score as a numerical value (e.g., an integer), wherein an overlap between two contours is associated with the overlapping contour that has the higher hierarchy score among the two contours. Control 546 can be configured such that no two contours can be assigned with the same hierarchy score.

Figure 7:
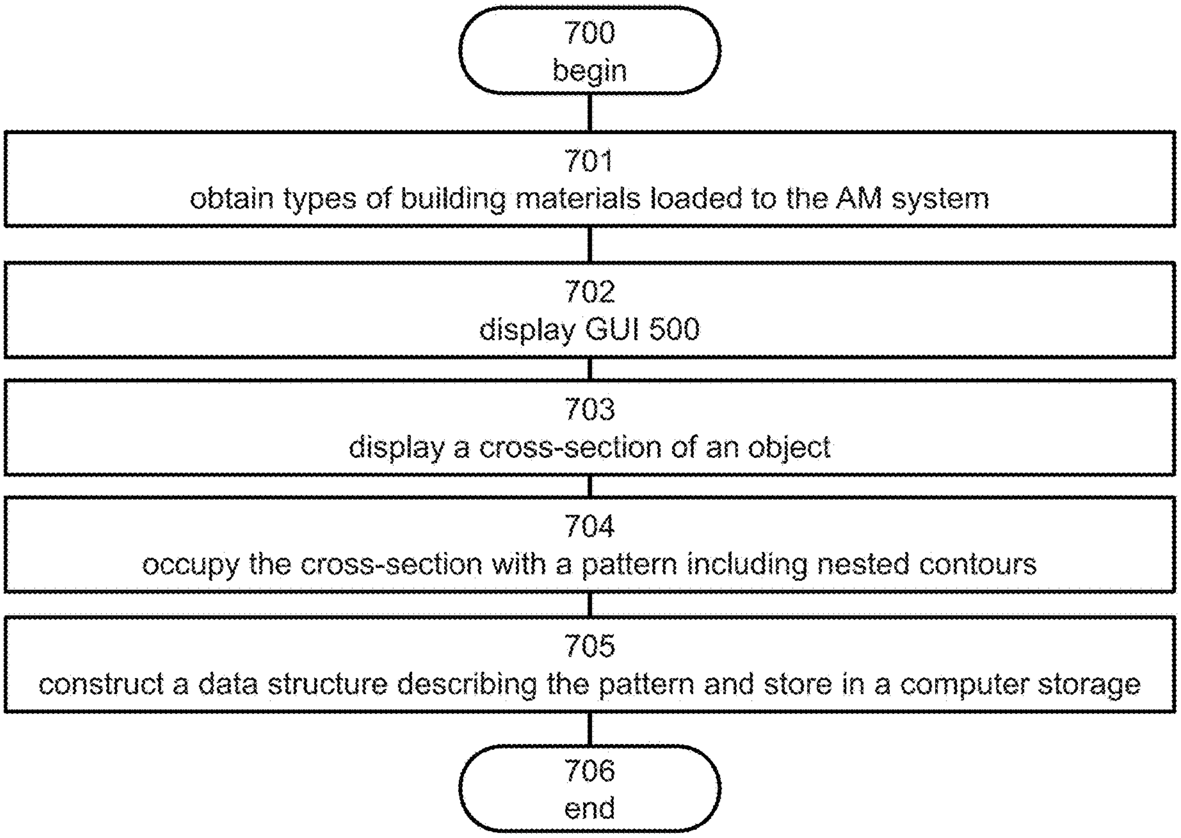
FIG. 7 is a flowchart diagram of a method suitable for encoding data for additive manufacturing, according some embodiments of the present invention.

Reference is now made to FIG. 7, which is a flowchart diagram of a method suitable for encoding data for additive manufacturing, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 700 and optionally and preferably continues to 701 at which types of building materials loaded to the AM system are obtained, as further detailed hereinabove. The method proceeds to 702 at which GUI 500 as further detailed hereinabove is displayed on a display device, and to 703 at which a cross-section of a three-dimensional object is displayed at visualization area 514 of GUI 500 as further detailed hereinabove. The object need not necessarily be an object which is intended to be manufactured by AM. This is because the same pattern can be automatically adapted to define planar segments of different objects. The method proceeds to 704 at which the displayed cross-section is occupied by a planar pattern having nested contours, as further detailed hereinabove. The method proceeds to 705 at which a data structure describing the planar pattern is constructed and stored in a computer storage.

The data structure includes all the information obtained from the controls of GUI 500 and is structured in a form that is readable by the slicer software of the AM system. The data structure includes geometrical information and material information, and may optionally and preferably also include metadata (e.g., creator, creation time, etc.). The geometrical information is in the form of three-dimensional coordinates for all the contours (and all the contour segments, if exist) that form each of the patterns described in the data structure. The material information associates each contour (and each contour segment, if exists) with a building material or combination of building materials, and, if exists, a material distribution association rule.

The method ends at 706.

Figure 8:
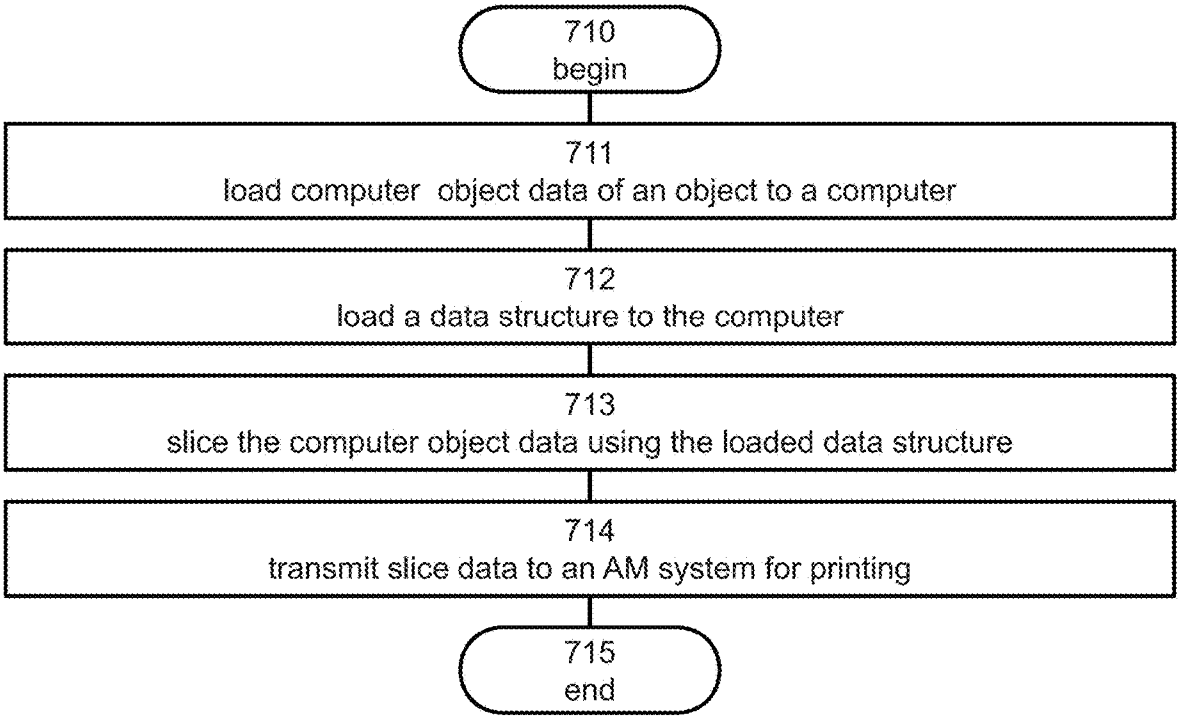
FIG. 8 is a flowchart diagram of a method suitable for additive manufacturing, according to some embodiments of the present invention.

FIG. 8 is a flowchart diagram of a method suitable for additive manufacturing, of a three-dimensional object in layers, according to various exemplary embodiments of the present invention. The method begins at 710 and proceeds to 711 at which computer object data of a three-dimensional object is loaded to a computer. The method proceeds to 712 at which a data structure describing one or more planar patterns (e.g., a data structure prepared by executing the method 700) is loaded to the computer.

In some embodiments of the present invention, the method receives at 712 a plurality of data structures and a hierarchy among the data structures. The hierarchy can be encoded in the data structures themselves or it can be loaded from an external source. The hierarchy can be in the form of a numerical hierarchy score, wherein a higher score corresponds to a higher location on the hierarchy scale, and to a data structure that is more preferred over a data structure assigned with a lower hierarchy score. Each of the data structures is associated with a different range of positions across the object (either along the same direction or along different directions). However, in some cases, two or more of the ranges partially overlap, so that two of the data structures describe planar patterns that contain the same voxel or group of voxels.

At 713 the computer object data are sliced by the computer running slicer software to provide slice data describing a plurality of slices, each defined over a plurality of voxels, and describing one of the layers of the object to be manufactured. The slicing operation 713 preferably assigns to each voxel of each slice, a building material according to a planar pattern that is described by the respective data structure and that contains the respective voxel. Typically, the slicing operation 713 first uses the geometrical information in the data structure to determine to which contour or contour segment the respective voxel belongs, and then uses the material information to assign the voxel with the building material that is associated with the determined contour or contour segment.

In cases in which two of the data structures include planar patterns that contain the same voxel, the method preferably selects for each such voxel, one of the data structures according to the hierarchy, and then assigns that voxel with a building material based on the material information in the selected data structure.

At 714 the slice data are transmitted to a controller of an AM system for additive manufacturing of a plurality of layers respectively corresponding to the plurality of slices.

The method ends at 715.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Exemplified Protocol

Figure 9:
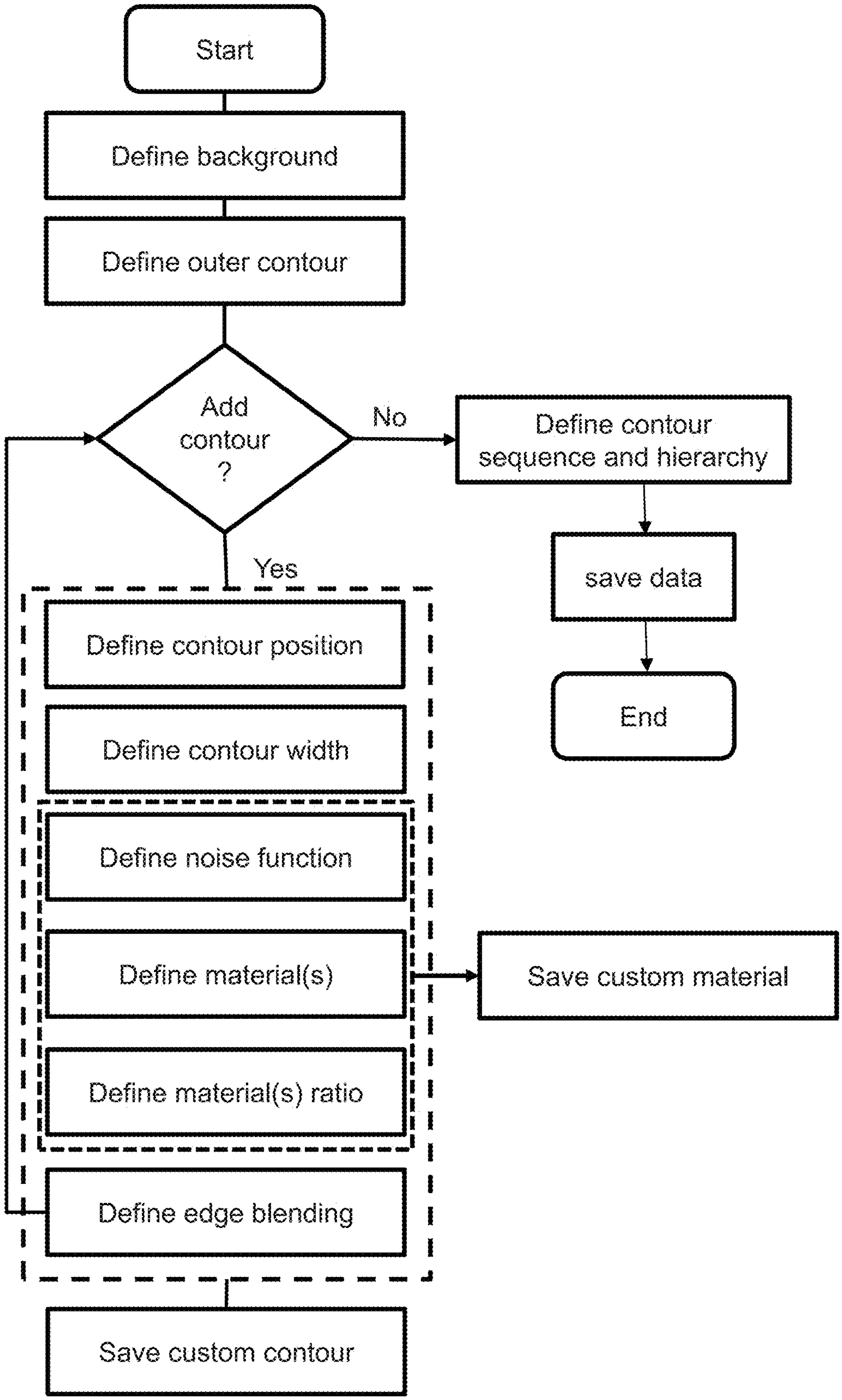
FIG. 9 is a flowchart diagram exemplifying an end-user protocol for encoding a planar pattern, according to some embodiments of the present invention.

FIG. 9 is a flowchart diagram exemplifying an end-user protocol for encoding a planar pattern. The protocol starts with a definition of the background materials and the outer contour. The protocol continues to a decision at which it is determined whether or not an additional contour is desired. If no, the protocol defines the sequences of the contours and their hierarchy, and then the saves the pattern data as a data structure in a computer storage medium. If an additional contour is desired, the protocol defines the position and width of the contour, associates materials to the contour (including the noise function, and the relative amounts), and also defines the edge blending, if desired. The materials defined for a specific contour can be saved separately from the data structure that describes the entire planar pattern. Similarly, the defined contour can be saved separately from the data structure that describes the entire planar pattern.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of encoding data for additive manufacturing, comprising:

displaying a graphical user interface (GUI) having at least a planar segment selector control, a pattern shaping control, and a material selection control;

displaying on said GUI a cross-section of a three-dimensional object at a position corresponding to a specific planar segment selected by said planar segment selector control;

displaying over said displayed cross-section, a planar pattern having nested contours, wherein each contour is shaped according to an input received by said pattern shaping control and is associated with at least one building material according to an input received by said material selection control; and storing in a computer storage a data structure describing said planar pattern.

2. The method of claim 1, comprising loading an image of an additional three-dimensional object into said GUI, loading said data structure from said computer storage, and displaying said planar pattern over a cross-section of said additional three-dimensional object.

3. The method according to claim 1, comprising transmitting an interrogating signal to an additive manufacturing system, responsively receiving a signal pertaining to types of building materials loaded to said system, and configuring said material selection control to allow selection only among said types of building materials.

4. The method according to claim 1, wherein said GUI comprises a background building material selection control, and the method comprises:

receiving from said background building material selection control input pertaining to a selection of a background building material or a selection of a background combination of building materials; and associating all regions of said three-dimensional object for which no input is received by said material selection control with one or more building materials according to said input from said background building material selection control.

5. The method according to claim 1, wherein said planar pattern comprises an outermost contour along a periphery of said cross-section, and wherein said pattern shaping control is configured to disallow defining for said outermost contour a width less than a predefined threshold.

6. The method according to claim 1, wherein said planar pattern comprises an outermost contour along a periphery of said cross-section, and said material selection control is configured to disallow selecting at least one building material for said outermost contour.

7. The method according to claim 1, wherein said pattern shaping control is configured to receive, for each contour, contour parameters as said input, said parameters comprising a distance of said contour from a periphery of said cross-section and a width of said contour, or distances of an outer and an inner boundary of said contour from said periphery of said cross-section.

8. The method according to claim 1, wherein said material selection control is configured to receive, for each contour, input pertaining to (i) a plurality of building materials to be associated with said contour, and (ii) relative amounts of said plurality of building materials.

9. The method according to claim 1, comprising storing in said computer storage a data structure which describes a single contour of said planar pattern independently from said data structure of said planar pattern.

10. The method according to claim 1, wherein said GUI comprises an edge blending control, wherein the method comprises displaying two adjacent contours such that graphical representations of building materials of said adjacent contours gradually vary at an interface between said adjacent contours, and wherein said data structure describing said planar pattern describes a gradual variation in amounts of said building materials of said adjacent contours that corresponds to said variation in said graphical representations.

11. The method according to claim 1, wherein said GUI comprises a contour repetition control, and the method comprises, upon activation of said contour repetition control, displaying at least one additional contour which is nested within other contours of said planar pattern, said at least one additional contour being a duplicate of a contour of said other contours, except smaller in size.

12. The method according to claim 1, wherein said pattern shaping control is configured to allow overlap among contours, wherein said GUI comprises a contour hierarchy control, and wherein the method comprises constructing said data structure such that each overlap between overlapping contours is associated with one of said overlapping contours based on input received by said contour hierarchy control.

13. The method according to claim 1, wherein said planar segment selector control is configured to receive input pertaining to a plurality of planar segments, and wherein said data structure describing said planar pattern comprises data associating a different planar pattern to each planar segment of said plurality of planar segments.

14. The method according to claim 1, wherein said GUI comprises a property display area, and the method comprises predicting a property of at least one contour of said nested contours and displaying said predicted property on said property display area.

15. A method of additive manufacturing, comprising:

executing the method according to claim 1;

receiving computer object data defining a shape of a three-dimensional object;

loading said data structure from said computer storage;

slicing said computer object data into a plurality of slices, each defined over a plurality of voxels, and assigning for each voxel of each slice, a building material according to a planar pattern that is described by said data structure and that contains said voxel; and transmitting said plurality of slices to a controller of an additive manufacturing system for additive manufacturing of a plurality of layers respectively corresponding to said plurality of slices.

16. A computer software product, comprising a computer-readable medium in which program instructions are stored, which instructions, when read by a data processor, cause the data processor to execute the method according to claim 1.

17. A system for encoding data for additive manufacturing, comprising:

a display device, a computer, and a computer storage, wherein said computer comprises a processor configured to display on said display device a graphical user interface (GUI) having at least a planar segment selector control, a pattern shaping control, and a material selection control, to receive input pertaining to a selection of a specific planar segment via said planar segment selector control, to display on said GUI a cross-section of a three-dimensional object at a position corresponding to said specific planar segment, to receive an input pertaining to shapes of nested contours via said pattern shaping control and an input pertaining to building materials associated with said contours via said material selection control, to display over said displayed cross-section a planar pattern having said nested contours, and to generate and store in said computer storage a data structure describing said planar pattern.

18. A method of encoding data for additive manufacturing of a three-dimensional object in layers perpendicular to a vertical direction, the method comprising:

loading from a computer storage computer object data describing the three-dimensional object;

loading from a computer storage a data structure describing a planar pattern defined over a plane that forms a non-zero angle with said layers, said planar pattern having a plurality of nested contours;

slicing said computer object data into a plurality of slices, each defined over a plurality of voxels, and describing one of the layers; and assigning for each voxel of each slice, a building material according to a planar pattern that is described by said data structure and that contains said voxel.

19. The method according to claim 18, comprising loading into a graphical user interface an image of a cross-section of said three-dimensional object, and superimposing said planar pattern over said cross-section.

20. A method of additive manufacturing, comprising:

executing the method according to claim 18; and transmitting said plurality of slices to a controller of an additive manufacturing system for additive manufacturing of the layers.

* * * * *